United States Patent
Li et al.

(10) Patent No.: US 11,923,940 B2
(45) Date of Patent: Mar. 5, 2024

(54) CHANNEL STATE INFORMATION REPORTING METHOD AND APPARATUS

(71) Applicant: HUAWEI TECHNOLOGIES CO., LTD., Guangdong (CN)

(72) Inventors: Xueru Li, Beijing (CN); Ruiqi Zhang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 598 days.

(21) Appl. No.: 17/144,626

(22) Filed: Jan. 8, 2021

(65) Prior Publication Data

US 2021/0135726 A1 May 6, 2021

Related U.S. Application Data

(63) Continuation of application No. PCT/CN2018/095088, filed on Jul. 10, 2018.

(51) Int. Cl.
*H04B 7/06* (2006.01)

(52) U.S. Cl.
CPC ......... *H04B 7/0626* (2013.01); *H04B 7/0634* (2013.01); *H04B 7/0639* (2013.01); *H04B 7/0663* (2013.01)

(58) Field of Classification Search
None
See application file for complete search history.

(56) References Cited

U.S. PATENT DOCUMENTS

2016/0043790 A1* 2/2016 Gaal .................... H04B 7/0417
375/267
2016/0344458 A1* 11/2016 Zhao ........................ H04L 1/16
(Continued)

FOREIGN PATENT DOCUMENTS

CN 102332945 A 1/2012
CN 105264802 A 1/2016
(Continued)

OTHER PUBLICATIONS

Nokia, Alcatel-Lucent Shanghai Bell , On beam grouping and reporting. 3GPP TSG-RAN WG1 Meeting #88bis, Spokane, WA, USA, Apr. 3-7, 2017, R1-1705959, 12 pages.
(Continued)

*Primary Examiner* — Phirin Sam
(74) *Attorney, Agent, or Firm* — WOMBLE BOND DICKINSON (US) LLP

(57) ABSTRACT

A channel state information reporting method and apparatus are described. The method can include a terminal device obtaining first indication information and sending the first indication information to a network device. The network device receives the first indication information, where the first indication information indicates a differential value between channel state information of a first antenna port set and channel state information of a second antenna port set. The first antenna port set includes x antenna ports of the terminal device, the second antenna port set includes m antenna ports of the terminal device, and the first antenna port set is different from the second antenna port set. The channel state information reporting method and apparatus in embodiments of this application help improve accuracy of channel state information obtained by a network device, and improve data transmission performance.

20 Claims, 4 Drawing Sheets

(56) References Cited

U.S. PATENT DOCUMENTS

| | | | |
|---|---|---|---|
| 2017/0195100 A1 | 7/2017 | Kim et al. | |
| 2017/0346612 A1* | 11/2017 | Kim | H04L 5/0048 |
| 2018/0076871 A1 | 3/2018 | Rahman et al. | |
| 2018/0083682 A1* | 3/2018 | Li | H04L 5/0051 |
| 2018/0205585 A1* | 7/2018 | Sadiq | H04B 7/088 |
| 2019/0280836 A1* | 9/2019 | Bhattad | H04W 56/001 |
| 2019/0306727 A1* | 10/2019 | Jiang | H04B 7/0632 |
| 2020/0052744 A1* | 2/2020 | Zhang | H04B 7/0626 |
| 2021/0127428 A1* | 4/2021 | Akkarakaran | H04L 5/0051 |
| 2021/0159959 A1* | 5/2021 | Li | H04L 5/0053 |
| 2022/0369304 A1* | 11/2022 | Grant | H04B 7/088 |
| 2023/0047887 A1* | 2/2023 | Zhang | H04L 5/0048 |
| 2023/0216567 A1* | 7/2023 | Yuan | H04B 7/0417 |
| | | | 370/330 |

FOREIGN PATENT DOCUMENTS

| | | |
|---|---|---|
| CN | 106160924 A | 11/2016 |
| CN | 106411457 A | 2/2017 |
| CN | 107925465 A | 4/2018 |
| WO | 2012102479 A2 | 8/2012 |
| WO | 2017137109 A1 | 8/2017 |

OTHER PUBLICATIONS

China Unicom, Discussion on group based beam reporting. 3GPP TSG RAN WG1 Meeting #90 , Prague, Czechia, 21th Aug. 25, 2017, R1-1714371, 4 pages.

Huawei, HiSilicon, "Summary of remaining issues on CSI reporting",3GPP TSG RAN WG1 Meeting #93 Busan, Korea, May 21 25, 2018 ,R1-1805950,total 10pages.

* cited by examiner

CHANNEL STATE INFORMATION REPORTING METHOD AND APPARATUS

CROSS-REFERENCE TO RELATED APPLICATIONS

This application is a continuation of International Application No. PCT/CN2018/095088, filed on Jul. 10, 2018, the disclosure of which is hereby incorporated by reference in its entirety.

TECHNICAL FIELD

This application relates to the communications field, and in particular, to a channel state information reporting method and apparatus in the communications field.

BACKGROUND

A multiple-input multiple-output (MIMO) technology is widely used in long term evolution (LTE) and a next-generation wireless system. If a network device can obtain all or some downlink channel information, a precoding technology may be used to improve signal transmission quality or a signal transmission rate.

In a frequency division duplex (FDD) system, information about a precoding matrix is fed back by a terminal device. The terminal device obtains downlink channel state information by measuring a channel state information-reference signal (CSI-RS), and feeds back the information about the precoding matrix to the network device in a form of a precoding matrix indicator (PMI). In a time division duplex (TDD) system, because an uplink and a downlink use a same frequency, the network device may obtain downlink channel state information by using channel reciprocity. For example, the terminal device sends a sounding reference signal (SRS), and the network device may obtain a downlink channel by measuring an uplink channel, to obtain the precoding matrix.

However, limited by factors such as costs, a quantity of transmit antenna ports of many terminal devices is less than a quantity of receive antenna ports. For example, the terminal device has one transmit antenna port, but has two receive antenna ports. After the terminal device sends an SRS by using one transmit antenna port, the network device can obtain only an uplink channel (also a downlink channel) $H_1$ corresponding to the transmit antenna port, and cannot obtain a downlink channel $H_2$ corresponding to another receive antenna port. In this case, when the network device needs to simultaneously transmit two layers of data streams to the terminal device, an accurate precoding matrix of the two layers of data streams cannot be obtained. Consequently, downlink data transmission performance is impaired.

To resolve a problem that in the TDD system, the network device cannot obtain a complete downlink channel matrix by using only an SRS, the following procedure may be used: The terminal device sends an SRS by using x transmit antenna ports, so that the network device obtains channels of the x transmit antenna ports. The terminal device measures a CSI-RS sent by the network device, obtains channel information of y receive antenna ports, and feeds back a PMI. The PMI indicates information about a channel matrix corresponding to m of y-x non-transmit antenna ports of the terminal device. The network device determines corresponding channel matrix information based on the information that is about the channel matrix of the m transmit antenna ports and that is indicated by the PMI, and reconstructs a complete downlink channel matrix with reference to information that is about a channel matrix of the x antenna ports and that is obtained by the network device through SRS measurement.

However, because radio frequency components of the network device and the terminal device are different, a power gain of a channel obtained by the network device based on SRS measurement is different from a power gain of a channel fed back by the terminal device based on CSI-RS measurement, and downlink channel state information obtained in the foregoing manner is not sufficiently accurate.

SUMMARY

This application provides a channel state information reporting method and apparatus, to help improve accuracy of channel state information obtained by a network device, to improve data transmission performance.

According to a first aspect, a channel state information reporting method is provided, including: A terminal device obtains first indication information. The first indication information is used to indicate a differential value between channel state information of a first antenna port set and channel state information of a second antenna port set. The first antenna port set includes x antenna ports of the terminal device, the second antenna port set includes m antenna ports of the terminal device, the first antenna port set is different from the second antenna port set, and x and m are positive integers. The terminal device sends the first indication information.

According to the channel state information reporting method in this embodiment of this application, the terminal device reports the differential value between the channel state information of the two parts of antenna ports, so that the network device can eliminate impact of different transmit power of the network device and the terminal device based on the differential value, thereby helping improve accuracy of the channel state information obtained by the network device, and improving data transmission performance.

It should be understood that, in this embodiment of this application, a differential value between A and B may be a differential value between A and B in a linear domain, or may be a differential value between A and B in a transform domain (for example, a dB domain). A linear domain difference is used as an example. The differential value between A and B may be AB, or BA, or A/B, or B/A. A dB domain difference is used as an example. The differential value between A and B may be A(dB)B (dB), or B(dB)A (dB), or A(dB)/B (dB), or B(dB)/A(dB). X(dB) represents a value obtained after X is transformed to dB. Specifically, a definition of transforming from the linear domain to the dB domain may be: $X(dB)=20\log_a(X)$ or $X(dB)=10\log_a(X)$, where a is a natural number, and X is a value of the linear domain. However, another transform domain is not excluded in this embodiment.

With reference to the first aspect, in some embodiments of the first aspect, the method further includes at least one of the following steps: The terminal device receives a first reference signal, and the first reference signal is used to obtain the first indication information. The terminal device sends the channel state information of the second antenna port set. The terminal device sends a second reference signal by using the first antenna port set.

Optionally, the first reference signal is used to determine the channel state information of the second antenna port set and the channel state information of the first antenna port set, to further obtain the first indication information.

It should be understood that, that the terminal device receives the first reference signal may mean that the terminal device receives the first reference signal by using all or some antenna ports in the second antenna port set and all or some antenna ports in the first antenna port set.

Specifically, a set including antenna ports corresponding to channel state information fed back by the terminal device by measuring the first reference signal is the first antenna port set. A set including all or some antenna ports used by the terminal device to send the second reference signal is the second antenna port set. In other words, in this embodiment of this application, a manner in which the network device obtains the channel state information of the first antenna port set is different from a manner in which the network device obtains the channel state information of the second antenna port set. Optionally, the first antenna port set and the second antenna port set may have an intersection set, that is, some antenna ports in the two sets are the same. In this case, the network device may obtain channel state information of the same antenna ports in the foregoing two manners, and the network device may determine, based on a situation, a manner to be finally used to obtain the channel state information. Optionally, the intersection set of the first antenna port set and the second antenna port set may alternatively be empty. This is not limited in this embodiment of this application.

For example, the terminal device has four antenna ports: a port 1, a port 2, a port 3, and a port 4, and has two power amplifiers (PA). Without loss of generality, port numbers may alternatively start from 0. This is not limited in this embodiment of this application.

If the terminal device does not support an antenna selection function, the PAs are respectively connected to the port 1 and the port 2. In a possible embodiment, the first antenna port set includes the port 1 and the port 2, and the second antenna port set includes the port 3 and the port 4. In this case, the intersection set of the first antenna port set and the second antenna port set is an empty set. The network device may obtain channel states of the port 1 and the port 2 by using the second reference signal, and may obtain channel states of the port 3 and the port 4 by using a feedback from the terminal device. In another possible embodiment, the second antenna port set may include one of the port 3 and the port 4, and the first antenna port set includes the port 1 and the port 2. In this case, the intersection set of the first antenna port set and the second antenna port set is an empty set. This is because the network device may determine a quantity of layers of data to be scheduled for each terminal device. If the network device determines that a maximum of three layers of data (it is assumed that the three layers of data correspond to the port 1, the port 2, and the port 3) are currently scheduled for the terminal device, after channel states of the port 1 and the port 2 are obtained by using the second reference signal, only channel state information of another port (that is, the port 3) may need to be obtained. This manner may cause a performance loss to some extent, but can reduce reporting overheads.

In another possible embodiment, the first antenna port set includes the port 1 and the port 2, and the second antenna port set includes the port 1, the port 3, and the port 4. In this case, there is an intersection set between the first antenna port set and the second antenna port set, but the first antenna port set and the second antenna port set are different. In this case, the network device may obtain a channel state of the port 1 by using the second reference signal. However, the network device determines that a signal-to-noise ratio (SNR) of a channel of the port 1 is excessively low. Therefore, the channel state of the port 1 that is obtained by measuring the second reference signal is inaccurate. In this case, the terminal device may be instructed to report channel state information of the port 1 by measuring the first reference signal, to reconstruct a more accurate channel.

If the terminal device supports an antenna selection function, the PAs may be respectively connected to the port 1 and the port 2 at one moment and respectively connected to the port 3 and the port 4 at another moment through switching by using switches. In a possible embodiment, the first antenna port set includes the port 1 the port 2, the port 3, and the port 4, and the second antenna port set includes the port 3 and the port 4. In this case, the intersection set of the first antenna port set and the second antenna port set is not an empty set, but the first antenna port set and the second antenna port set are different. In an application scenario, the terminal device periodically uses the port 1 and the port 2 to send the second reference signal at moments $n_1+T$, $n_1+2T, \ldots$, and the like, and periodically uses the port 3 and the port 4 to send the second reference signal at moments $n_2+T$ and $n_{2+2}T$. At a moment $n_3$, the network device determines to trigger the terminal device to report CSI. In this case, assuming that the second reference signal closest to the moment $n_3$ is sent by the terminal device by using the port 1 and the port 2, channel state information of the port 1 and the port 2 can still be used, but channel state information of the port 3 and the port 4 is too old to be used. Therefore, the network device may trigger the terminal device to report the channel state information corresponding to the port 3 and the port 4, thereby improving accuracy of reconstructing a channel.

In the foregoing application scenario, in an alternative definition, the second antenna port set may include the port 3 and the port 4, and the first antenna port set includes the port 1 and the port 2. In this definition manner, ports whose channel state information is obtained by the network device by using the feedback from the terminal device constitute the second antenna port set, and ports whose channel state information is obtained only by measuring the second reference signal constitute the first antenna port set. In this case, the intersection set of the first antenna port set and the second antenna port set is an empty set.

It should be understood that, in this application, specific definitions of the second antenna port set and the first antenna port set are not limited, and only a difference between the second antenna port set and the first antenna port set is constrained.

With reference to the first aspect, in some embodiments of the first aspect, the first indication information is a wideband parameter, or the first indication information is a subband parameter.

Specifically, if the first indication information is a wideband parameter, the terminal device needs to report only one piece of first indication information for an entire CSI reporting bandwidth. If the first indication information is a subband parameter, the terminal device needs to report one piece of first indication information for each subband in the CSI reporting bandwidth.

With reference to the first aspect, in some embodiments of the first aspect, the channel state information of the first antenna port set includes first amplitude information associated with a channel matrix $G_u$ of the first antenna port set; and/or the channel state information of the second antenna port set includes second amplitude information associated with a channel matrix $G_d$ of the second antenna port set, where $G_d$ is a matrix with m rows and M columns, $G_u$ is a matrix with x rows and M columns, and M is a positive integer.

Specifically, in this specification, the channel matrix $G_u$ of the first antenna port set is a matrix including channel vectors corresponding to all or some antenna ports in the first antenna port set. A specific form may be as follows: Assuming that a channel vector corresponding to an $i^{th}$ port in the first antenna port set is represented as $G_{u,i}$, $G_{u,i}=[g_{u,i,1} \ g_{u,i,2} \cdots g_{u,i,M}] \in C^{1 \times M}$, where $g_{u,i,j}$ represents a channel coefficient between a $j^{th}$ antenna port of the network device and the $i^{th}$ antenna port, and is a complex number. In this case, all antenna ports are used as an example, and a matrix including channel vectors corresponding to all the antenna ports in the first antenna port set is represented as $$G_u = \begin{bmatrix} G_{u,1} \\ \ldots \\ G_{u,x} \end{bmatrix} \in C^{x \times M}.$$

x represents a quantity of the ports included in the first antenna port set, and M is a quantity of ports used by the network device to send the first reference signal. An expression form of a matrix $G_u$ including channel vectors corresponding to some antenna ports in the first antenna port set is similar. In this case, a quantity of rows of $G_u$ is a quantity of antenna ports in the some antenna ports.

Similarly, the channel matrix $G_d$ of the second antenna port set is a matrix including channel vectors corresponding to all or some ports in the second antenna port set. A specific form may be as follows: Assuming that a channel vector corresponding to an $i^{th}$ port in the second antenna port set is represented as $G_{d,i}$, $G_{d,i}=[g_{d,i,1} \ g_{d,i,2} \cdots g_{d,i,M}]$, where $g_{d,i,j}$ represents a channel coefficient between a $i^{th}$ antenna port of the network device and the $i^{th}$ antenna port, and is a complex number. In this case, all ports are used as an example, and a matrix including channel vectors corresponding to all the antenna ports in the second antenna port set is represented as $$G_d = \begin{bmatrix} G_{d,1} \\ \ldots \\ G_{d,m} \end{bmatrix} \in C^{m \times M}.$$

m represents a quantity of the ports included in the second antenna port set, and M is a quantity of ports used by the network device to send the first reference signal. An expression form of a matrix $G_d$ including channel vectors corresponding to some antenna ports in the second antenna port set is similar. In this case, a quantity of rows of $G_d$ is a quantity of antenna ports in the some antenna ports.

Specifically, the first amplitude information associated with $G_u$ may be determined based on amplitude information of an element in the channel matrix $G_u$ of the first antenna port set, or may be determined based on one piece of amplitude information obtained after all or some elements of $G_u$ are processed. The second amplitude information associated with $G_d$ may be determined based on amplitude information of an element in the channel matrix $G_d$ of the second antenna port set, or may be determined based on one piece of amplitude information obtained after all or some elements of $G_d$ are processed. This is not limited in this embodiment of this application. It should be understood that the first amplitude information may be subband amplitude information or wideband amplitude information, and the second amplitude information may be subband amplitude information or wideband amplitude information. This is not limited in this embodiment of this application.

The first amplitude information associated with $G_u$ is used as an example. The first amplitude information may be an amplitude function. For example, the first amplitude information may be an amplitude, a power, or a value obtained after the amplitude or the power is transformed to another domain (for example, the dB domain). Alternatively, the first amplitude information may be an amplitude, a power, or a value obtained after the amplitude or the power is transformed to the dB domain and processed (for example, normalized or quantized). This is not limited in this embodiment of this application.

Optionally, the first amplitude information may be a function of amplitude information of an element in $G_u$. Optionally, the first amplitude information may be a function of amplitude information of all or some elements of $G_u$.

The channel state information of the second antenna port set is similar to the channel state information of the first antenna port set. Details are not described herein again.

In this embodiment of this application, the first indication information may be a wideband parameter, or may be a subband parameter.

If the first indication information is a wideband parameter, the first amplitude information and the second amplitude information are each wideband amplitude information. In a possible embodiment, on each subband, amplitudes of (all or some) elements of the channel matrix $G_d$ of the second antenna port set or (all or some) elements of a matrix $W_{2,d}$ corresponding to $G_d$ are jointly represented by wideband amplitudes and subband differential amplitudes. In this case, when reporting $G_d$, the terminal device may normalize the wideband amplitudes of the all or some elements by using the first amplitude information as a reference, and normally report the subband differential amplitudes. In another possible embodiment, on each subband, amplitudes of all or some elements of $G_d$ or all or some elements of $W_{2,d}$ are directly represented by using subband amplitudes, and are not split in a form of wideband amplitudes and subband differential amplitudes. In this case, when reporting $G_d$, the terminal device may normalize the subband amplitudes of the all or some elements by using the first amplitude information as a reference. Correspondingly, an operation performed by the network device on the channel matrix $G_u$ of the first antenna port set is similar to an operation performed by the terminal device on $G_d$. Details are not described herein again.

If the first indication information is a subband parameter, the first amplitude information and the second amplitude information are each subband amplitude information. In a possible embodiment, on each subband, amplitudes of (all or some) elements of $G_d$ or (all or some) elements of $W_{2,d}$ are directly represented by using subband amplitudes, and are not divided in a form of wideband amplitudes and subband differential amplitudes. In this case, when reporting $G_d$, the terminal device may normalize the subband amplitudes of the foregoing elements by using a subband amplitude of the first amplitude information as a reference. Correspondingly, an operation performed by the network device on the channel matrix $G_u$ of the first antenna port set is similar to an operation performed by the terminal device on $G_d$. Details are not described herein again.

In a possible embodiment, the channel state information is power information, or a dB domain value of power information, and a power is a square of an amplitude. Therefore, it may also be understood that the channel state information is a function of the amplitude.

With reference to the first aspect, in some embodiments of the first aspect, the first amplitude information is determined based on any one of the following elements: an element whose amplitude information has a largest value in at least one row of elements of $G_u$, an element whose amplitude information has a largest value in at least one column of elements of a matrix $W_{2,u}$ corresponding to $G_u$, a singular value whose amplitude information has a largest value in at least one singular value of $G_u$, or an eigenvalue whose amplitude information has a largest value in at least one eigenvalue of $G_u$; and/or the second amplitude information is determined based on any one of the following elements: an element whose amplitude information has a largest value in at least one row of elements of $G_d$, an element whose amplitude information has a largest value in at least one column of elements of a matrix $W_{2,d}$ corresponding to $G_d$, an eigenvalue whose amplitude information has a largest value in at least one eigenvalue of $G_d$, or a singular value whose amplitude information has a largest value in at least one singular value of $G_d$, where $G_u^T(1_u)=W_1 \times W_{2,u}(1_u)$, $G_d^T(1_d)=W_1 \times W_{2,d}(1_d)$, $X^T$ represents transposition of a matrix X, $X(1_u)$ represents an $1_u^{th}$ column of the matrix X, $X(1_d)$ represents an $1_d^{th}$ column of the matrix X, $W_1$ is an M*N matrix, $W_{2,u}$ is an N*x matrix, $W_{2,d}$ is an N*m matrix, N is a positive integer, $1_u \in \{1, 2, \ldots, x\}$, and $1_d \in \{1, 2, \ldots, m\}$.

With reference to the first aspect, in some embodiments of the first aspect, the first amplitude information is determined based on an element whose amplitude information has a largest value in at least one row of elements of $G_u$, and the second amplitude information is determined based on an element whose amplitude information has a largest value in at least one row of elements of $G_d$.

With reference to the first aspect, in some embodiments of the first aspect, the first amplitude information is determined based on an element whose amplitude information has a largest value in at least one column of elements of a matrix $W_{2,u}$ corresponding to $G_u$, and the second amplitude information is determined based on an element whose amplitude information has a largest value in at least one column of elements of a matrix $W_{2,d}$ corresponding to $G_d$, where $G_u^T(1_u)=W_1 \times W_{2,u}(1_u)$, $G_d^T(1_d)=W_1 \times W_{2,d}(1_d)$, $X^T$ represents transposition of a matrix X, $X(1_u)$ represents an $1_u^{th}$ column of the matrix X, $X(1_d)$ represents an $1_d^{th}$ column of the matrix X, $W_1$ is an M*N matrix, $W_{2,u}$ is an N*x matrix, $W_{2,d}$ is an N*m matrix, N is a positive integer $1_u \in \{1, 2, \ldots, x\}$, and $1_d \in \{1, 2, \ldots, m\}$.

In this embodiment of this application, $W_1$ is a block diagonal matrix, $$W_1 = \begin{bmatrix} A & 0 \\ 0 & A \end{bmatrix},$$

$A=[b_1, b_2, L\ b_L]$ includes L basis vectors, and N=2L. Specifically, $W_1$ is a wideband parameter, and $W_{2,u}$ and $W_{2,d}$ each include wideband parameters (for example, wideband amplitudes) and subband parameters (for example, a subband differential amplitude and a subband phase); or $W_{2,u}$ and $W_{2,d}$ each include subband parameters (for example, a subband amplitude and a subband phase). The terminal device may represent $G_u$ and $G_d$ by feeding back an index of a parameter of $W_1$ and an index of a parameter of $W_2$.

With reference to the first aspect, in some embodiments of the first aspect, the first amplitude information is determined based on an element whose amplitude information has a largest value in at least one row of elements of $G_u$, and the second amplitude information is determined based on an element whose amplitude information has a largest value in at least one column of elements of a matrix $W_{2,d}$ corresponding to $G_d$, where $G_d^T(1_d)=W_1 \times W_{2,d}(1_d)$, $X^T$ represents transposition of a matrix X, $X(1_d)$ represents an $1_d^{th}$ column of the matrix X, $W_1$ is an M*N matrix, $W_{2,d}$ is an N*m matrix, N is a positive integer, and $1_d \in \{1, 2, \ldots, m\}$.

In this embodiment, the first amplitude information is directly determined based on the channel matrix $G_u$, so that the terminal device can be prevented from decomposing $G_u$ by using a double codebook structure, and the network device does not need to decompose the uplink channel matrix by using the double codebook structure when reconstructing a complete channel state matrix. In this way, complexity of the network device and the terminal device is reduced while accurate channel state information can be obtained.

With reference to the first aspect, in some embodiments of the first aspect, the first amplitude information is determined based on a singular value whose amplitude information has a largest value in at least one singular value of $G_u$, and the second amplitude information is determined based on a singular value whose amplitude information has a largest value in at least one singular value of $G_d$.

With reference to the first aspect, in some embodiments of the first aspect, the first amplitude information is determined based on an eigenvalue whose amplitude information has a largest value in at least one eigenvalue of $G_u$, and the second amplitude information is determined based on an eigenvalue whose amplitude information has a largest value in at least one eigenvalue of $G_d$.

With reference to the first aspect, in some embodiments of the first aspect, the first amplitude information is amplitude information of a first element, and the first element is an element in $G_u$, an element in a matrix $W_{2,u}$ corresponding to $G_u$, a singular value of $G_u$, or an eigenvalue of $G_u$; and/or the second amplitude information is amplitude information of a second element, and the second element is an element in $G_d$, an element in a matrix $W_{2,d}$ corresponding to $G_d$, a singular value of $G_d$, or an eigenvalue of $G_d$.

With reference to the first aspect, in some embodiments of the first aspect, the first amplitude information is determined based on an element whose amplitude information has a largest value in at least one row of elements of $G_u$, or the first amplitude information is amplitude information of a first element, and an index of the first element is predefined; and the second amplitude information includes n sub-elements, an $i^{th}$ sub-element in the n sub-elements is determined based on an element whose amplitude information has a largest value in M elements in an $i^{th}$ row in n rows of $G_d$, n is a positive integer, and $i \in \{1, 2, \ldots, n\}$.

With reference to the first aspect, in some embodiments of the first aspect, the first amplitude information is determined based on an element whose amplitude information has a largest value in at least one column of elements of a matrix $W_{2,u}$ corresponding to $G_u$, or the first amplitude information is amplitude information of a first element, and an index of the first element is predefined; and the second amplitude information includes n sub-elements, an $i^{th}$ sub-element in the n sub-elements is determined based on an element whose amplitude information has a largest value in N elements in an $i^{th}$ column inn columns of a matrix $W_{2,d}$ corresponding to $G_d$, n is a positive integer, and i∈{1, 2, . . . , n}, where $G_u^T(1_u)=W_1 \times W_{2,u}(1_u)$, $G_d^T(1_d)=W_1 \times W_{2,d}(1_d)$, $X^T$ represents transposition of a matrix X, $X(1_u)$ represents an $1_u^{th}$ column of the matrix X, $X(1_d)$ represents an $1_d^{th}$ column of the matrix X, $W_1$ is an M*N matrix, $W_{2,u}$ is an N*x matrix, $W_{2,d}$ is an N*m matrix, N is a positive integer, $1_u \in \{1, 2, \ldots, x\}$, and $1_d \in \{1, 2, \ldots, m\}$.

In a possible embodiment, n is greater than or equal to 2.

With reference to the first aspect, in some embodiments of the first aspect, at least one row of $G_d$ includes n rows, n is a positive integer, and the method further includes:

The terminal device sends second indication information. The second indication information is used to indicate differential values between amplitude information of remaining n−1 third elements other than a second element in n third elements and amplitude information of the second element. An $i^{th}$ third element in the n third elements is determined based on an element whose amplitude information has a largest value in M elements in an $i^{th}$ row in the n rows. The second amplitude information is determined based on the amplitude information of the second element.

With reference to the first aspect, in some embodiments of the first aspect, at least one column in the matrix $W_{2,d}$ includes n columns, n is a positive integer, and the method further includes:

The terminal device sends third indication information. The third indication information is used to indicate differential values between amplitude information of remaining n−1 fourth elements other than a second element in n fourth elements and amplitude information of the second element. An $i^{th}$ fourth element in the n fourth elements is determined based on an element whose amplitude information has a largest value in N elements in an $i^{th}$ column in the n columns. The second amplitude information is determined based on the amplitude information of the second element.

With reference to the first aspect, in some embodiments of the first aspect, the method further includes: The terminal device sends fourth indication information. The fourth indication information is used to indicate an index of the first element and/or an index of the second element.

With reference to the first aspect, in some embodiments of the first aspect, the index of the first element is predefined; and/or the index of the second element is predefined.

With reference to the first aspect, in some embodiments of the first aspect, the first amplitude information is determined based on amplitude information of at least two elements of $G_u$, or the first amplitude information is determined based on amplitude information of at least two elements of a matrix $W_{2,u}$ corresponding to $G_u$; and/or the second amplitude information is determined based on amplitude information of at least two elements of $G_d$; or the second amplitude information is determined based on amplitude information of at least two elements of a matrix $W_{2,d}$ corresponding to $G_d$, where $G_d^T(1_d)=W_1 \times W_{2,d}(1_d)$, $X^T$ represents transposition of a matrix X, $X(1_d)$ represents an $1_d^{th}$ column of the matrix X, $W_1$ is an M*N matrix, $W_{2,d}$ is an N*m matrix, N is a positive integer, and $1_d \in \{1, 2, \ldots, m\}$.

Specifically, the foregoing determining based on the amplitude information of the at least two elements may be determining based on a function of the amplitude information of the at least two elements. Optionally, the foregoing function may be a weighted sum of the amplitude information of the at least two elements, or may be a weighted sum transformed to another domain (for example, the dB domain), or may be a weighted average value of the amplitude information of the at least two elements, or may be a weighted average value transformed to another domain (for example, the dB domain).

With reference to the first aspect, in some embodiments of the first aspect, the first amplitude information is determined based on an average value amplitude information of at least two elements of $G_u$, and the second amplitude information is determined based on an average value of amplitude information of at least two elements of $G_d$; or the first amplitude information is determined based on an average value of amplitude information of at least two elements of a matrix $W_{2,u}$ corresponding to $G_u$, and the second amplitude information is determined based on an average value of amplitude information of at least two elements of a matrix $W_{2,d}$ corresponding to $G_d$.

Further, the weighted average value of the amplitude information of the at least two elements may be a weighted average value of wideband amplitude information or a weighted average value of subband amplitude information. The foregoing determining based on the average value may include determining based on the average value, or may include determining based on a function of the average value, for example, determining based on a sum value of the amplitude information of the at least two elements. The sum value is a multiple of the average value. This is not limited in this embodiment of this application.

It should be understood that the average value mentioned in this embodiment of this application may be an arithmetic average value, or may be a geometric average value, a root-mean-square average value, or a weighted average value. This is not limited in this embodiment of this application.

With reference to the first aspect, in some embodiments of the first aspect, the first amplitude information is determined based on a sum of amplitude information of at least two elements of $G_u$, and the second amplitude information is determined based on a sum of amplitude information of at least two elements of $G_d$; or the first amplitude information is determined based on a sum of amplitude information of at least two elements of a matrix $W_{2,u}$ corresponding to $G_u$, and the second amplitude information is determined based on a sum of amplitude information of at least two elements of a matrix $W_{2,d}$ corresponding to $G_d$.

Further, the weighted sum of the amplitude information of the at least two elements may be a weighted sum of wideband amplitude information or a weighted sum of subband amplitude information. The foregoing determining based on the sum may include determining based on the sum value of the amplitude information, or may include determining based on a function of the sum value. This is not limited in this embodiment of this application.

With reference to the first aspect, in some embodiments of the first aspect, the first amplitude information is determined based on norm information of a matrix $G'_u$, and the second amplitude information is determined based on norm information of a matrix $G'_d$; or the first amplitude information is determined based on norm information of a matrix $W_{2,u}$ corresponding to a matrix $G'_u$, and the second amplitude information is determined based on norm information of a matrix $W_{2,d}$ corresponding to $G'_d$, where $G'_u{}^T(1_u)=W_1 \times W_{2,u}(1_u)$, $G'_d{}^T(1_d)=W_1 \times W_{2,d}(1_d)$, $X^T$ represents transposition of a matrix X, $X(1_u)$ represents an $1_u^{th}$ column of the matrix X, $X(1_d)$ represents an $1_d^{th}$ column of the matrix X, $W_1$ is an M*N matrix, $W_{2,u}$ is an N*x matrix, $W_{2,d}$ is an N*m matrix, N is a positive integer, $l_u \in \{1, 2, \ldots, x\}$, $l_d \in \{1, 2, \ldots, m\}$, $G'_u$ includes at least two elements of $G_u$, and $G'_d$ includes at least two elements of $G_d$.

It should be understood that the norm information of the matrix $G'_u$ may be a function of a subband p-norm of $G'_u$, or may be a function of a wideband p-norm of $G'_u$, or may be a function of an average value of a subband p-norm, and a possible form of the function is similar to that described above. This is not limited in this embodiment of this application. p is a natural number. The norm information of each of $G'_d$, $W_{2,d}$, and $W_{2,u}$ is similar to the norm information of $G'_u$.

With reference to the first aspect, in some embodiments of the first aspect, the first antenna port set is predefined, or is determined by the terminal device based on a configuration of the network device, or is determined based on a terminal capability reported by the terminal device; and/or the second antenna port set is predefined, or is determined by the terminal device based on a configuration of the network device, or is determined based on a terminal capability reported by the terminal device.

In a possible embodiment, the first antenna port set and the second antenna port set may be predefined. For example, in an alternative definition, an antenna port that is used to send the second reference signal for k times closest to a moment at which the network device triggers the terminal device to report the channel state information constitutes an antenna port set, remaining other antenna ports in y antenna ports of the terminal device are the second antenna port set, and k is a positive integer.

In another possible embodiment, the first antenna port set and the second antenna port set may be determined based on a configuration of the network device. For example, the network device may indicate, by using configuration information, antenna ports that are used by the terminal device to report the channel state information. In this case, these antenna ports are the second antenna port set, and remaining other antenna ports in y antenna ports of the terminal device constitute the first antenna port set. For another example, the network device may indicate antenna ports that do not correspond to the channel state information reported by the terminal device. In this case, these antenna ports constitute the first antenna port set, and other antenna ports constitute the second antenna port set. It should be understood that a specific indication manner may be direct indication or indirect indication. This is not limited in this embodiment of this application. If direct indication is used, the network device may indicate a port number of an antenna port. If indirect indication is used, the network device may indicate a port quantity of antenna ports.

In another possible embodiment, the first antenna port set and the second antenna port set may be determined based on a terminal capability, and the terminal capability may be reported by the terminal device to the network device. For example, if the terminal device reports that the terminal device has two transmit antennas and four receive antennas (2T4R), the first antenna port set includes two of the four antenna ports, and the second antenna port set includes the other two antenna ports of the four antenna ports.

With reference to the first aspect, in some embodiments of the first aspect, the first antenna port set and/or the second antenna port set are/is determined by the terminal device by using configuration information carried in at least one of the following signaling sent by the network device: radio resource control RRC signaling, multiple access control MAC control element CE signaling, and downlink control information DCI signaling.

Specifically, the network device may configure the first antenna port set and/or the second antenna port set for the terminal device by using at least one of the RRC signaling, the DCI signaling, and the MAC CE signaling. The following describes several cases in detail. However, it should be understood that the following cases are merely examples, and do not constitute any impact on the protection scope of the embodiments of this application.

(1) RRC: The network device may indicate, by using the RRC signaling, configuration information reported by using the channel state information. The configuration information may be directly used to determine the first antenna port set and/or the second antenna port set. The terminal device receives the configuration information, and may determine the first antenna port set and/or the second antenna port set based on the configuration information. Optionally, reporting of the channel state information is periodic.

(2) RRC+DCI: The network device may indicate, by using the RRC signaling, configuration information reported by using the channel state information. The configuration information may be used to determine the first antenna port set and/or the second antenna port set. The network device triggers, by using the DCI signaling, the terminal device to report the channel state information. Optionally, reporting of the channel state information is non-periodic or semi-persistent.

(3) RRC+DCI: The terminal device is 2T4R and supports antenna selection. The network device may indicate, by using the RRC signaling, configuration information reported by using the channel state information. The configuration information may be used to determine that the second antenna port set includes all of the four antenna ports of the terminal device. Because the second reference signal is sent by using only two antenna ports each time, the network device may select, by using the DCI signaling, two of the four antenna ports that are not to be used for reporting this time or that are to be used for reporting this time. For example, numbers of the four ports are 0, 1, 2, and 3 respectively. The network device may select, by using the DCI signaling, the port 1 and the port 2 as ports to be used for the current reporting, so that the terminal device determines that the current first antenna port set includes the port 1 and the port 2, and that the current second antenna port set includes the port 3 and the port 4.

In this embodiment of this application, a relatively large set is configured by using the RRC signaling, and a subset in the set is selected as the first antenna port set by using the DCI signaling, so that an implementation is more flexible, and a quantity of pieces of channel state information reported in an RRC configuration can be reduced. For example, if channel SNRs of two of the four antenna ports of the terminal device are relatively low, SRS measurement of the two antenna ports is very inaccurate, resulting in inaccurate precoding of downlink data. Channel state feedbacks of the two antenna ports are triggered by using the DCI, so that accuracy of channel information of the two ports can be improved.

(4) RRC+MAC CE+DCI: The network device may send configuration information by using the RRC signaling, to indicate a plurality of possible antenna port sets, and then select, by using the MAC CE signaling, some antenna port sets from the plurality of possible antenna port sets as candidate sets, and finally select, by using the DCI signaling, an antenna port set from the candidate sets as the first antenna port set and/or the second antenna port set corresponding to the current reporting.

With reference to the first aspect, in some embodiments of the first aspect, the first reference signal is a channel state information-reference signal CSI-RS; and/or the second reference signal is a sounding reference signal SRS.

According to a second aspect, a channel state information reporting method is provided, including: A network device sends a first reference signal. The network device receives first indication information obtained by a terminal device based on the first reference signal. The first indication information is used to indicate a differential value between channel state information of a first antenna port set and channel state information of a second antenna port set, the first antenna port set includes x antenna ports of the terminal device, the second antenna port set includes m antenna ports of the terminal device, the first antenna port set is different from the second antenna port set, and x and m are positive integers.

With reference to the second aspect, in some embodiments of the second aspect, the method further includes at least one of the following steps: The network device receives the channel state information of the second antenna port set. The network device receives a second reference signal.

With reference to the second aspect, in some embodiments of the second aspect, the first indication information is a wideband parameter, or the first indication information is a subband parameter.

With reference to the second aspect, in some embodiments of the second aspect, the channel state information of the first antenna port set includes first amplitude information associated with a channel matrix $G_u$ of the first antenna port set; and/or the channel state information of the second antenna port set includes second amplitude information associated with a channel matrix $G_d$ of the second antenna port set, where $G_d$ is a matrix with m rows and M columns, $G_u$ is a matrix with x rows and M columns, and M is a positive integer.

With reference to the second aspect, in some embodiments of the second aspect, the first amplitude information is determined based on any one of the following elements: an element whose amplitude information has a largest value in at least one row of elements of $G_u$, an element whose amplitude information has a largest value in at least one column of elements of a matrix $W_{2,u}$ corresponding to $G_u$, a singular value whose amplitude information has a largest value in at least one singular value of $G_u$, or an eigenvalue whose amplitude information has a largest value in at least one eigenvalue of $G_u$; and/or the second amplitude information is determined based on any one of the following elements: an element whose amplitude information has a largest value in at least one row of elements of $G_d$, an element whose amplitude information has a largest value in at least one column of elements of a matrix $W_{2,d}$ corresponding to $G_d$, an eigenvalue whose amplitude information has a largest value in at least one eigenvalue of $G_d$, or a singular value whose amplitude information has a largest value in at least one singular value of $G_d$, where $G_u^T(1_u)=W_1 \times W_{2,u}(1_u)$, $G_d^T(1_d)=W_1 \times W_{2,d}(1_d)$, $X^T$ represents transposition of a matrix X, $X(1_u)$ represents an $1_u^{th}$ column of the matrix X, $X(1_d)$ represents an $1_d^{th}$ column of the matrix X, $W_1$ is an M*N matrix, $W_{2,u}$ is an N*x matrix, $W_{2,d}$ is an N*m matrix, N is a positive integer, $1_u \in \{1, 2, \ldots, x\}$, and $1_d \in \{1, 2, \ldots, m\}$.

With reference to the second aspect, in some embodiments of the second aspect, the first amplitude information is determined based on an element whose amplitude information has a largest value in at least one row of elements of $G_u$, and the second amplitude information is determined based on an element whose amplitude information has a largest value in at least one row of elements of $G_d$.

With reference to the second aspect, in some embodiments of the second aspect, the first amplitude information is determined based on an element whose amplitude information has a largest value in at least one column of elements of a matrix $W_{2,u}$ corresponding to $G_u$, and the second amplitude information is determined based on an element whose amplitude information has a largest value in at least one column of elements of a matrix $W_{2,d}$ corresponding to $G_d$, where $G_u^T(1_u)=W_1 \times W_{2,u}(1_u)$, $G_d^T(1_d)=W_1 \times W_{2,d}(1_d)$, $X^T$ represents transposition of a matrix X, $X(1_u)$ represents an $1_u^{th}$ column of the matrix X, $X(1_d)$ represents an $1_d^{th}$ column of the matrix X, $W_1$ is an M*N matrix, $W_{2,u}$ is an N*x matrix, $W_{2,d}$ is an N*m matrix, N is a positive integer, $1_u \in \{1, 2, \ldots, x\}$, and $1_d \in \{1, 2, \ldots, m\}$.

With reference to the second aspect, in some embodiments of the second aspect, the first amplitude information is determined based on an element whose amplitude information has a largest value in at least one row of elements of $G_u$, and the second amplitude information is determined based on an element whose amplitude information has a largest value in at least one column of elements of a matrix $W_{2,d}$ corresponding to $G_d$, where $G_d^T(1_d)=W_1 \times W_{2,d}(1_d)$, $X^T$ represents transposition of a matrix X, $X(1_d)$ represents an $1_d^{th}$ column of the matrix X, $W_1$ is an M*N matrix, $W_{2,d}$ is an N*m matrix, N is a positive integer, and $1_d \in \{1, 2, \ldots, m\}$.

With reference to the second aspect, in some embodiments of the second aspect, the first amplitude information is determined based on a singular value whose amplitude information has a largest value in at least one singular value of $G_u$, and the second element is determined based on a singular value whose amplitude information has a largest value in at least one singular value of $G_d$.

With reference to the second aspect, in some embodiments of the second aspect, the first amplitude information is determined based on an eigenvalue whose amplitude information has a largest value in at least one eigenvalue of $G_u$, and the second element is determined based on an eigenvalue whose amplitude information has a largest value in at least one eigenvalue of $G_d$.

With reference to the second aspect, in some embodiments of the second aspect, the first amplitude information is a first element, and the first element is an element in $G_u$, an element in a matrix $W_{2,u}$ corresponding to $G_u$, a singular value of $G_u$, or an eigenvalue of $G_u$; and/or the second amplitude information is a second element, and the second element is an element in $G_d$, an element in a matrix $W_{2,d}$ corresponding to $G_d$, a singular value of $G_d$, or an eigenvalue of $G_d$.

With reference to the second aspect, in some embodiments of the second aspect, the first amplitude information is determined based on an element whose amplitude information has a largest value in at least one row of elements of $G_u$, or the first amplitude information is a first element, and an index of the first element is predefined; and the second amplitude information includes n sub-elements, an $i^{th}$ sub-element in the n sub-elements is determined based on an element whose amplitude information has a largest value in M elements in an $i^{th}$ row in n rows of $G_d$, n is a positive integer, and $i \in \{1, 2, \ldots, n\}$.

With reference to the second aspect, in some embodiments of the second aspect, the first amplitude information is determined based on an element whose amplitude information has a largest value in at least one column of elements of a matrix $W_{2,u}$ corresponding to $G_u$, or the first amplitude information is a first element, and an index of the first element is predefined; and the second amplitude information includes n sub-elements, an $i^{th}$ sub-element in the n sub-elements is determined based on an element whose amplitude information has a largest value in N elements in an $i^{th}$ column in n columns of a matrix $W_{2,d}$ corresponding to $G_d$, n is a positive integer, and $i \in \{1, 2, \ldots, n\}$, where $G_u^T(1_u)=W_1 \times W_{2,u}(1_u)$, $G_d^T(1_d)=W_1 \times W_{2,d}(1_d)$, $x^T$ represents transposition of a matrix X, $X(1_u)$ represents an $1_u^{th}$ column of the matrix X, $X(1_d)$ represents an $1_d^{th}$ column of the matrix X, $W_1$ is an M*N matrix, $W_{2,u}$ is an N*x matrix, $W_{2,d}$ is an N*m matrix, N is a positive integer, $1_u \in \{1, 2, \ldots, x\}$, and $1_d \in \{1, 2, \ldots, m\}$.

With reference to the second aspect, in some embodiments of the second aspect, at least one row of $G_d$ includes n rows, n is a positive integer, and the method further includes:

The network device receives second indication information. The second indication information is used to indicate differential values between amplitude information of n−1 third elements other than the second element in n third elements and amplitude information of the second element. An $i^{th}$ third element in the n third elements is determined based on an element whose amplitude information has a largest value in M elements in an $i^{th}$ row in the n rows. The second amplitude information is determined based on the amplitude information of the second element.

With reference to the second aspect, in some embodiments of the second aspect, at least one column in the matrix $W_{2,d}$ includes n columns, n is a positive integer, and the method further includes:

The network device receives third indication information. The third indication information is used to indicate differential values between amplitude information of n−1 fourth elements other than the second element in n fourth elements and amplitude information of the second element. An $i^{th}$ fourth element in the n fourth elements is determined based on an element whose amplitude information has a largest value in N elements in an $i^{th}$ column in the n columns. The second amplitude information is determined based on the amplitude information of the second element.

With reference to the second aspect, in some embodiments of the second aspect, the method further includes: The network device receives fourth indication information. The fourth indication information is used to indicate an index of the first element and/or an index of the second element.

With reference to the second aspect, in some embodiments of the second aspect, the index of the first element is predefined; and/or the index of the second element is predefined.

With reference to the second aspect, in some embodiments of the second aspect, the first amplitude information is determined based on amplitude information of at least two elements of $G_u$, and the second amplitude information is determined based on amplitude information of at least two elements of $G_d$; or the first amplitude information is determined based on amplitude information of at least two elements of a matrix $W_{2,u}$ corresponding to $G_u$, and the second amplitude information is determined based on amplitude information of at least two elements of a matrix $W_{2,d}$ corresponding to $G_d$, where $G_u^T=W_1 \times W_{2,u}(1_u)$ $G_d^T(1_d)=W_1 \times W_{2,d}(1_d)$, $X^T$ represents transposition of a matrix X, $X(1_u)$ represents an $1_u^{th}$ column of the matrix X, $X(1_d)$ represents an $1_d^{th}$ column of the matrix X, $W_1$ is an M*N matrix, $W_{2,u}$ is an N*x matrix, $W_{2,d}$ is an N*m matrix, N is a positive integer, $1_u \in \{1, 2, \ldots, x\}$, and $1_d \in \{1, 2, \ldots, m\}$.

With reference to the second aspect, in some embodiments of the second aspect, the first amplitude information is determined based on an average value amplitude information of at least two elements of $G_u$, and the second amplitude information is determined based on an average value of amplitude information of at least two elements of $G_d$; or the first amplitude information is determined based on an average value of amplitude information of at least two elements of a matrix $W_{2,u}$ corresponding to $G_u$, and the second amplitude information is determined based on an average value of amplitude information of at least two elements of a matrix $W_{2,d}$ corresponding to $G_d$.

With reference to the second aspect, in some embodiments of the second aspect, the first amplitude information is determined based on a sum of amplitude information of at least two elements of $G_u$, and the second amplitude information is determined based on a sum of amplitude information of at least two elements of $G_d$; or the first amplitude information is determined based on a sum of amplitude information of at least two elements of a matrix $W_{2,u}$ corresponding to $G_u$, and the second amplitude information is determined based on a sum of amplitude information of at least two elements of a matrix $W_{2,d}$ corresponding to $G_d$.

With reference to the second aspect, in some embodiments of the second aspect, the first amplitude information is determined based on norm information of a matrix $G'_u$, and the second amplitude information is determined based on norm information of a matrix $G'_d$; or the first amplitude information is determined based on norm information of a matrix $W_{2,u}$ corresponding to a matrix $G'_u$, and the second amplitude information is determined based on norm information of a matrix $W_{2,d}$ corresponding to $G'_u$, where $G'^T_u=W_1 \times W_{2,u}(1_u)$, $G_d T$ $G'^T_d(1_d)=W_1 \times W_{2,d}(1_d)$, $X^T$ represents transposition of a matrix X, $X(1_u)$ represents an $1_u^{th}$ column of the matrix X, $X(1_d)$ represents an $1_d^{th}$ column of the matrix X, $W_1$ is an M*N matrix, $W_{2,u}$ is an N*x matrix, $W_{2,d}$ is an N*m matrix, N is a positive integer, $1_u \in \{1, 2, \ldots, x\}$, $1_d \in \{1, 2, \ldots, m\}$, $G'_u$ includes at least two elements of $G_u$, and $G'_d$ includes at least two elements of $G_d$.

With reference to the second aspect, in some embodiments of the second aspect, the first antenna port set is predefined, or is determined by the terminal device based on a configuration of the network device, or is determined based on a terminal capability reported by the terminal device; and/or the second antenna port set is predefined, or is determined by the terminal device based on a configuration of the network device, or is determined based on a terminal capability reported by the terminal device.

With reference to the second aspect, in some embodiments of the second aspect, the first reference signal is a channel state information-reference signal CSI-RS; and/or the second reference signal is a sounding reference signal SRS.

According to a third aspect, a channel state information reporting apparatus is provided, configured to perform the method according to any one of the first aspect or the possible embodiments of the first aspect. Specifically, the apparatus includes a unit configured to perform the method according to any one of the first aspect or the possible embodiments of the first aspect.

According to a third aspect, another channel state information reporting apparatus is provided, configured to perform the method according to any one of the second aspect or the possible embodiments of the second aspect. Specifically, the apparatus includes a unit configured to perform the method according to any one of the second aspect or the possible embodiments of the second aspect.

According to a fifth aspect, another channel state information reporting apparatus is provided. The apparatus includes a transceiver, a memory, and a processor. The transceiver, the memory, and the processor communicate with each other by using an internal connection path. The memory is configured to store an instruction. The processor is configured to execute the instruction stored in the memory, to control a receiver to receive a signal and control a transmitter to send a signal. In addition, when the processor executes the instruction stored in the memory, the processor is enabled to perform the method according to any one of the first aspect or the possible embodiments of the first aspect.

According to a sixth aspect, another channel state information reporting apparatus is provided. The apparatus includes a transceiver, a memory, and a processor. The transceiver, the memory, and the processor communicate with each other by using an internal connection path. The memory is configured to store an instruction. The processor is configured to execute the instruction stored in the memory, to control a receiver to receive a signal and control a transmitter to send a signal. In addition, when the processor executes the instruction stored in the memory, the processor is enabled to perform the method according to any one of the second aspect or the possible embodiments of the second aspect.

According to a seventh aspect, a channel state information reporting system is provided. The system includes the apparatus according to any one of the third aspect or possible embodiments of the third aspect and the apparatus according to any one of the fourth aspect or possible embodiments of the fourth aspect; or the system includes the apparatus according to any one of the fifth aspect or possible embodiments of the fifth aspect and the apparatus according to any one of the sixth aspect or possible embodiments of the sixth aspect.

According to an eighth aspect, a computer program product is provided. The computer program product includes computer program code. When the computer program code is run by a computer, the computer is enabled to perform the methods in the foregoing aspects.

According to a ninth aspect, a computer-readable medium is provided, and is configured to store a computer program. The computer program includes an instruction used to perform the methods in the foregoing aspects.

According to a tenth aspect, a chip system is provided, including an input interface, an output interface, at least one processor, and a memory. The input interface, the output interface, the processor, and the memory are connected to each other by using an internal connection path. The processor is configured to execute code in the memory. When the code is executed, the processor is configured to perform the methods in the foregoing aspects.

DESCRIPTION OF EMBODIMENTS

Figure 1:
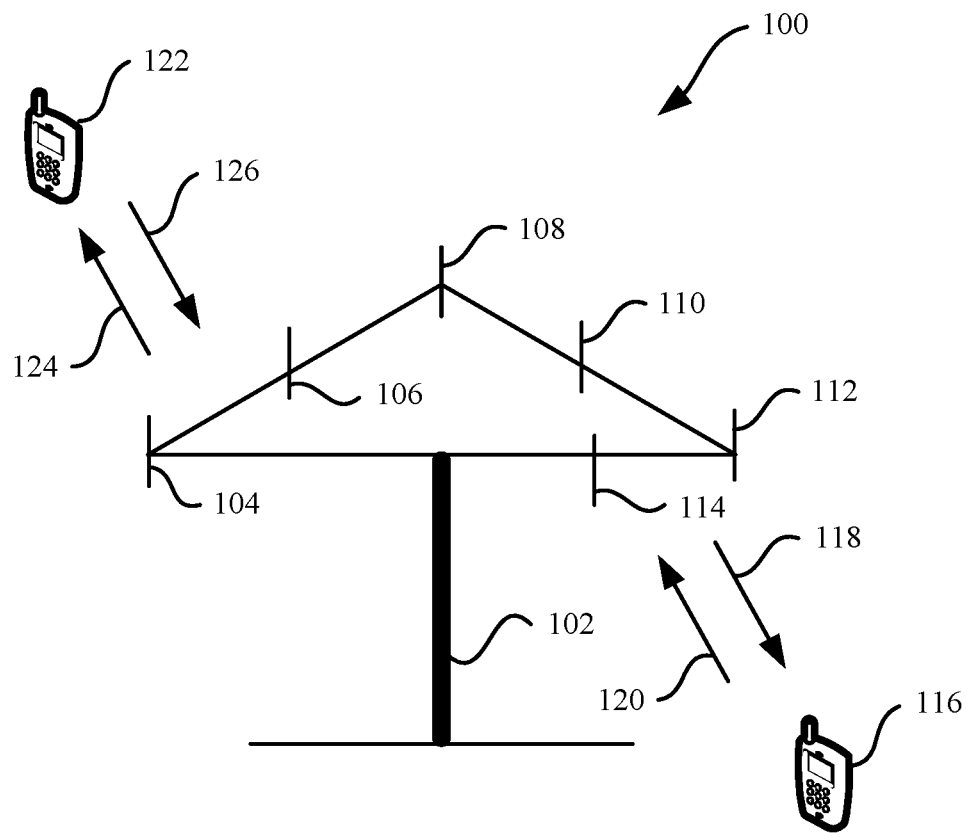
FIG. 1 is a schematic diagram of a communications system according to an embodiment of this application.

The following describes technical solutions of this application with reference to the accompanying drawings.

It should be understood that the technical solutions of the embodiments of this application may be applied to various communications systems, such as a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunications system (UMTS), a worldwide interoperability for microwave access (WiMAX) communications system, a future 5th generation (5G) system, or a new radio (NR) system.

It should be further understood that the technical solutions of the embodiments of this application may be further applied to various communications systems based on a non-orthogonal multiple access technology, for example, a sparse code multiple access (SCMA) system. Certainly, SCMA may also be referred to as another name in the communications field. Further, the technical solutions of the embodiments of this application may be applied to a multi-carrier transmission system using the non-orthogonal multiple access technology, for example, an orthogonal frequency division multiplexing (OFDM) system, a filter bank multi-carrier (FBMC) system, or a generalized frequency division multiplexing (GFDM) system, or a filtered-orthogonal frequency division multiplexing (F-OFDM) system using the non-orthogonal multiple access technology.

It should be further understood that, in the embodiments of this application, a terminal device may communicate with one or more core networks by using a radio access network (RAN). The terminal device may be referred to as an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like.

It should be further understood that in the embodiments of this application, a network device may be configured to communicate with the terminal device. The network device may be a base transceiver station (BTS) in a GSM system or a CDMA system, or may be a NodeB (NB) in a WCDMA system, or may be an evolved NodeB (evolutional node B, eNB or eNode B) in an LTE system. Alternatively, the network device may be a relay station, an access point, an in-vehicle device, a wearable device, a network-side device in a future 5G network, a network device in a future evolved PLMN network, or the like.

The embodiments of this application are applicable to an LTE system and a subsequent evolved system such as 5G, or another wireless communications system that uses various radio access technologies, for example, a system that uses an access technology such as code division multiple access, frequency division multiple access, time division multiple access, orthogonal frequency division multiple access, or single carrier frequency division multiple access, and are particularly applicable to a scenario that requires channel information feedback and/or a two-stage precoding technology, for example, a wireless network in which a massive MIMO technology is applied, or a wireless network in which a distributed antenna technology is applied.

It should be understood that a multiple-input multiple-output (MIMO) technology means that a transmit end device and a receive end device respectively use a plurality of transmit antennas and a plurality of receive antennas, so that a signal is transmitted and received by using the plurality of antennas of the transmit end device and the receive end device, thereby improving communication quality. The technology can fully use space resources and implement multiple-input multiple-output by using a plurality of antennas, so that a system channel capacity can be multiplied without increasing spectrum resources and antenna transmit power.

MIMO may be classified into single-user multiple-input multiple-output (SU-MIMO) and multi-user multiple-input multiple-output (MU-MIMO). Based on a multi-user beamforming principle, hundreds of antennas are disposed on a transmit end device in massive MIMO, to modulate respective beams of dozens of target receivers. Through spatial signal isolation, dozens of signals are simultaneously transmitted on a same frequency resource. Therefore, the massive MIMO technology can fully use a spatial degree of freedom brought by a large-scale antenna configuration, to improve spectral efficiency.

FIG. 1 is a schematic diagram of a communications system used in an embodiment of this application. As shown in FIG. 1, the communications system 100 includes a network device 102, and the network device 102 may include a plurality of antenna groups. Each antenna group may include one or more antennas. For example, one antenna group may include antennas 104 and 106, another antenna group may include antennas 108 and 110, and an additional group may include antennas 112 and 114. In FIG. 1, two antennas are shown for each antenna group. However, more or fewer antennas may be used for each group. The network device 102 may additionally include a transmitter chain and a receiver chain. A person of ordinary skill in the art may understand that both the transmitter chain and the receiver chain may include a plurality of components related to signal sending and receiving, for example, a processor, a modulator, a multiplexer, a demodulator, a demultiplexer, or an antenna.

The network device 102 may communicate with a plurality of terminal devices. For example, the network device 102 may communicate with a terminal device 116 and a terminal device 122. However, it may be understood that the network device 102 may communicate with any quantity of terminal devices similar to the terminal device 116 or 122.

The terminal devices 116 and 122 each may be, for example, a cellular phone, a smartphone, a portable computer, a handheld communications device, a handheld computing device, a satellite radio apparatus, a global positioning system, a PDA, and/or any other suitable device configured to perform communication in the wireless communications system 100.

As shown in FIG. 1, the terminal device 116 communicates with the antennas 112 and 114. The antennas 112 and 114 send information to the terminal device 116 by using a forward link 118, and receive information from the terminal device 116 by using a reverse link 120. In addition, the terminal device 122 communicates with the antennas 104 and 106. The antennas 104 and 106 send information to the terminal device 122 by using a forward link 124, and receive information from the terminal device 122 by using a reverse link 126.

For example, in a frequency division duplex FDD system, for example, the forward link 118 may use a frequency band different from that used by the reverse link 120, and the forward link 124 may use a frequency band different from that used by the reverse link 126.

For another example, in a time division duplex TDD system and a full duplex system, the forward link 118 and the reverse link 120 may use a common frequency band, and the forward link 124 and the reverse link 126 may use a common frequency band.

Each group of antennas and/or area designed for communication is referred to as a sector of the network device 102. For example, an antenna group may be designed to communicate with a terminal device in a sector in a coverage area of the network device 102. In a process in which the network device 102 separately communicates with the terminal devices 116 and 122 by using the forward links 118 and 124, transmit antennas of the network device 102 may improve signal-to-noise ratios of the forward links 118 and 124 through beamforming. In addition, compared with a manner in which the network device sends signals to all terminal devices of the network device by using a single antenna, when the network device 102 sends, through beamforming, signals to the terminal devices 116 and 122 that are randomly dispersed in a related coverage area, less interference is caused to a mobile device in a neighboring cell.

In a given time, the network device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain a specific quantity of data bits that need to be sent to the wireless communications receiving apparatus by using a channel. For example, the wireless communications sending apparatus may generate, receive from another communications apparatus, or store, in a memory, a specific quantity of data bits that need to be sent to the wireless communications receiving apparatus by using a channel. The data bits may be included in a transport block or a plurality of transport blocks of data, and the transport block may be segmented to Generate a plurality of code blocks.

In addition, the communications system 100 may be a public land mobile network PLMN network, a device-to-device (D2D) network, a machine-to-machine (M2M) network, or another network. FIG. 1 is only a simplified schematic diagram of an example for ease of understanding. The network may further include another network device that is not shown in FIG. 1.

For ease of understanding, the following first describes a related background of the embodiments of this application.

For example, the terminal device has y receive antenna ports and z power amplifiers (PA), where z<y. When the terminal device supports antenna selection or does not support antenna selection, based on the foregoing plurality of definition manners, it may be determined that x of the y antenna ports constitute a first antenna port set, and m of the y antenna ports constitute a second port set. Because the quantity of PAs is less than the quantity of receive antenna ports, when preparing to perform downlink data scheduling, the network device cannot obtain accurate downlink channel state information of all the y receive ports in time by using an SRS.

To resolve a problem that a network device cannot obtain a complete downlink channel matrix by using only an SRS in a TDD system, the following channel state information obtaining procedure may be used, so that the network device can obtain complete downlink channel state information.

(1) The terminal device sends an SRS by using x transmit antenna ports, so that the network device obtains a channel $H_u$ of the x transmit antenna ports.

(2) The terminal device measures a CSI-RS sent by the network device, obtains channel information of the y receive antenna ports, and feeds back corresponding indication information. The indication information indicates information about channel matrix information Ha corresponding to m of the y antenna ports of the terminal device, where the m ports are different from at least one of the x ports.

(3) The network device reconstructs a downlink channel matrix $$\begin{bmatrix} H_u \\ H_d \end{bmatrix} \in C^{(x+m) \times M}$$

by using the information about the channel matrix $H_d$ and $H_u$ that is obtained by the network device through SRS measurement, to obtain a downlink precoding matrix.

However, because radio frequency components of the network device and the terminal device are different, the channel $H_u$ measured by the network device includes impact of a power used by the terminal device to send the SRS. In other words, the network device obtains $G_{srs} = \sqrt{p_{srs}} H_u$ through measurement, where $G_{srs}$ is a measured value, and $H_u$ is an actual value. The terminal device obtains $$G_{csi-rs} = \begin{bmatrix} G_{csi-rs,u} \\ G_{csi-rs,d} \end{bmatrix} = \sqrt{p_{csi-rs}} \begin{bmatrix} H_u \\ H_d \end{bmatrix}$$

through measurement, where $G_{csi-rs}$ is a measured value, and $H_u$ and $H_d$ are actual values. In this specification, $G_{csi-rs,u}$ is also referred to as $G_u$, and $G_{csi-rs,d}$ is also referred to as $G_d$.

The network device reconstructs a channel $\sqrt{p^{csi-rs}} H_d$ indicated by the indication information fed back by the terminal device and a channel $G_{srs}$ measured by the network device, to obtain a channel matrix $$H_{cons} = \begin{bmatrix} \sqrt{p_{srs}} & \\ & \sqrt{p_{csi-rs}} \end{bmatrix} \begin{bmatrix} H_u \\ H_d \end{bmatrix}.$$

In other words, power gains of the two parts of channels are different. As a result, a precoding matrix obtained by the network device by performing an operation on the channel matrix $H_{cons}$ is inaccurate. A method for obtaining a precoding matrix is to perform singular value decomposition (SVD) or eigenvalue decomposition on $H_{cons}^{H} H_{cons}$, and use obtained rank primary eigenvectors as a precoding matrix of each data layer. Because power gains are different, the primary eigenvector is inaccurate.

Therefore, to resolve the foregoing problem of different power gains, the embodiments of this application provide a new channel state information reporting method.

Figure 2:
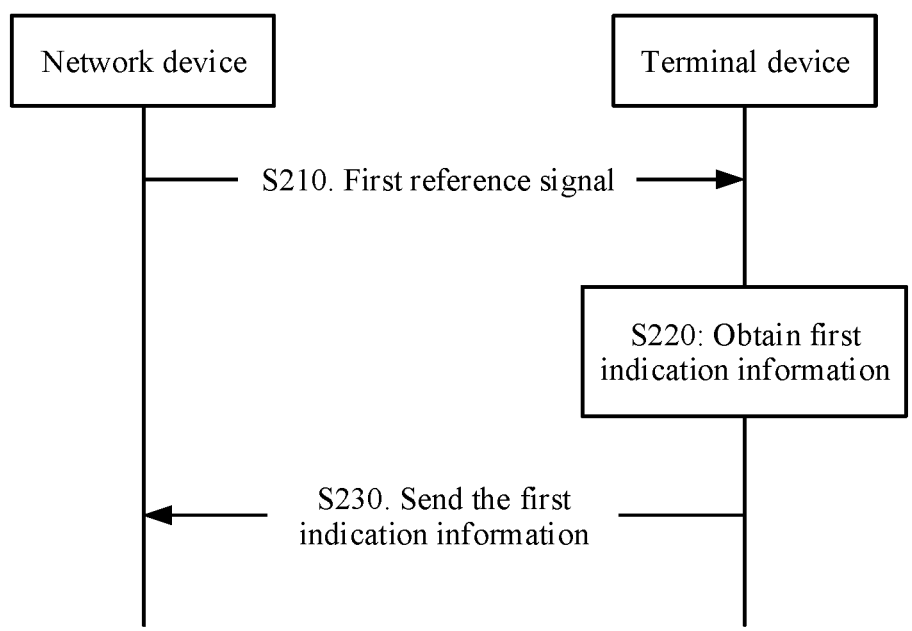
FIG. 2 is a schematic flowchart of a channel state information reporting method according to an embodiment of this application.

FIG. 2 is a schematic flowchart of a channel state information reporting method 200 according to an embodiment of this application. The method 200 may be applied to the communications system 100 shown in FIG. 1. However, this embodiment of this application is not limited thereto.

S210. A network device sends a first reference signal to a terminal device, and correspondingly, the terminal device receives the first reference signal.

S220. The terminal device obtains first indication information by measuring the first reference signal, where the first indication information is used to indicate a differential value between channel information of a first antenna port set and channel information of a second antenna port set. The first antenna port set includes x antenna ports of the terminal device, the second antenna port set includes m antenna ports of the terminal device, the first antenna port set is different from the second antenna port set, and x and m are positive integers.

S230. The terminal device sends the first indication information to the network device, and correspondingly, the network device receives the first indication information.

Further, the network device may determine downlink channel state information between the terminal device and the network device based on the first indication information.

Specifically, the network device may send the first reference signal to the terminal device, and the terminal device receives the first reference signal, and performs channel measurement to obtain a downlink channel state. The terminal device determines, based on the downlink channel state obtained through measurement, differential values between channel state information of the x antenna ports of the terminal device and channel state information of the m antenna ports of the terminal device. The terminal device may send the differential value to the network device, so that the network device eliminates, based on the differential value, impact caused by different power factors between the channel state information corresponding to the two parts of antenna ports, to obtain more accurate downlink channel state information.

According to the channel state information reporting method in this embodiment of this application, the terminal device reports the differential value between the channel state information of the two parts of antenna ports, so that the network device can eliminate impact of different transmit power of the network device and the terminal device based on the differential value, thereby helping improve accuracy of the channel state information obtained by the network device, and improving data transmission performance.

It should be understood that, in this embodiment of this application, a differential value between A and B may be a differential value between A and B in a linear domain, or may be a differential value between A and B in a transform domain (for example, a dB domain). A linear domain difference is used as an example. The differential value between A and B may be A−B, or B−A, or A/B, or B/A. A dB domain difference is used as an example. The differential value between A and B may be A(dB)−B (dB), or B(dB)−A(dB), or A(dB)/B (dB), or B(dB)/A(dB). X(dB) represents a value obtained after X is transformed to dB. Specifically, a definition of transforming from the linear domain to the dB domain may be: X(dB)=20 $\log_a(X)$ or X(dB)=10 $\log_a(X)$, where a is a natural number, and X is a value of the linear domain. However, another transform domain is not excluded in this embodiment.

In an optional embodiment, the method further includes at least one of the following steps:

The terminal device sends the channel state information of the second antenna port set, and correspondingly, the network device receives the channel state information of the second antenna port set.

The terminal device sends a second reference signal by using the first antenna port set, and correspondingly, the network device receives the second reference signal.

Specifically, the network device may receive the second reference signal (for example, an SRS), and perform channel measurement. Because the second reference signal is sent by the terminal device by using all or some ports in the first antenna port set, the network device can obtain channel state information of only some of they antenna ports through channel measurement. For some other channels, which are corresponding to the second antenna port set in this embodiment, the network device may send the first reference signal (for example, a CSI-RS) to the terminal device. The terminal device receives the first reference signal, performs channel measurement, then reports the channel state information of the second antenna port set to the network device, and reports the differential value between the channel state information of the first antenna port set and the channel state information of the second antenna port set to the network device. The network device may determine the uplink channel state information of the first antenna port set as the downlink channel state information of the first antenna port set based on channel reciprocity. Then, the network device may eliminate power impact of the first antenna port set and the second antenna port set based on the first indication information and the channel state information of the second antenna port set that are reported by the terminal device, to reconstruct accurate downlink channel state information.

Figure 3:
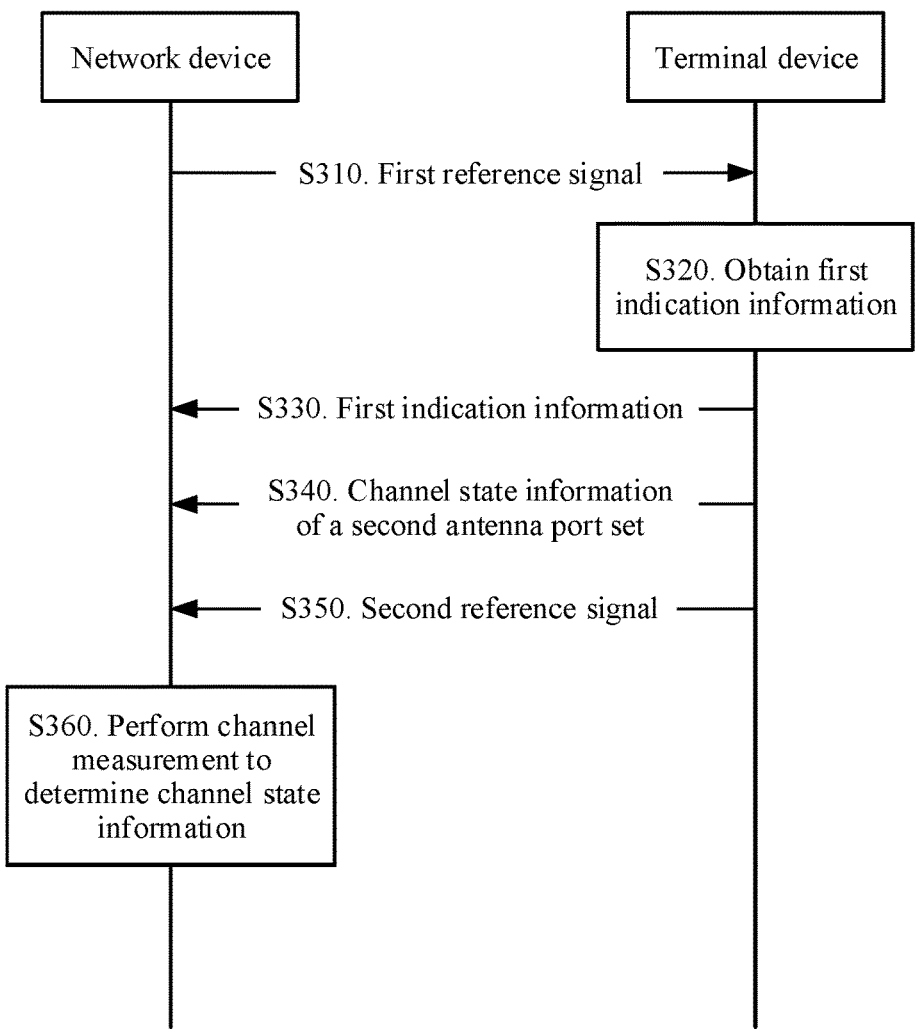
FIG. 3 is a schematic flowchart of another channel state information reporting method according to an embodiment of this application.

In an embodiment of a possible implementation, a specific procedure is shown in FIG. 3, and includes the following steps.

S310. A network device sends a first reference signal (for example, a CSI-RS) to a terminal device, and the terminal device receives the first reference signal.

S320. The terminal device may perform downlink channel measurement based on the first reference signal, to obtain first indication information.

S330. The terminal device sends the first indication information to the network device, and the network device receives the first indication information.

S340. The terminal device sends channel state information of a second antenna port set to the network device, and the network device receives the channel state information of the second antenna port set.

S350. The terminal device sends a second reference signal (for example, an SRS) to the network device by using a first antenna port set, and the network device receives the second reference signal.

S360. The network device may perform channel measurement based on the second reference signal to obtain channel state information of the first antenna port set, and determine final downlink channel state information in combination with the channel state information of the second antenna port set and a differential value that is between channel information of the first antenna port set and channel information of the second antenna port set and that is indicated by the first indication information that are reported by the terminal device.

According to the channel state information reporting method in this embodiment of this application, the network device obtains, by using the second reference signal, the channel information corresponding to the first antenna port set, and obtains, by using a feedback from the terminal device, the channel information corresponding to the second antenna port. Complete downlink channel information is obtained in combination with the two pieces of channel information. Because only channel information corresponding to some antenna ports needs to be fed back, a problem that CSI is inaccurate when there is no channel reciprocity in a TDD system can be resolved, and feedback overheads can be reduced.

Optionally, the first reference signal is used to determine the channel state information of the second antenna port set and the channel state information of the first antenna port set, to further obtain the first indication information. Specifically, the terminal device may measure the first reference signal, and determine a channel matrix $G_u$ corresponding to a port in the first antenna port set and a channel matrix $G_d$ corresponding to a port in the second antenna port set. Further, the terminal device may determine first amplitude information based on amplitude information of an element in $G_u$, determine second amplitude information based on amplitude information of an element in $G_d$, and further determine a differential value between the first amplitude information and the second amplitude information. The terminal device may finally obtain the first indication information based on the differential value (or perform an operation such as quantization on the differential value).

It should be understood that, that the terminal device receives the first reference signal may mean that the terminal device receives the first reference signal by using all or some antenna ports in the second antenna port set and all or some antenna ports in the first antenna port set.

Specifically, antenna ports corresponding to channel state information determined and fed back by the terminal device by measuring the first reference signal constitute the first antenna port set, and all or some antenna ports corresponding to the second reference signal sent by the terminal device constitute the second antenna port set. In other words, in this embodiment of this application, a manner in which the network device obtains the channel state information of the first antenna port set is different from a manner in which the network device obtains the channel state information of the second antenna port set. The first antenna port set and the second antenna port set may have an intersection set (that is, some antenna ports in the two sets are the same), or the intersection set may be empty. This is not limited in this embodiment of this application.

For example, the terminal device has four antenna ports: a port 1, a port 2, a port 3, and a port 4, and has two power amplifiers (power amplifier, PA). Without loss of generality, port numbers may alternatively start from 0. This is not limited in this embodiment of this application.

If the terminal device does not support an antenna selection function, the PAs are respectively connected to the port 1 and the port 2. In a possible embodiment, the first antenna port set includes the port 1 and the port 2, and the second antenna port set includes the port 3 and the port 4. In this case, the intersection set of the first antenna port set and the second antenna port set is an empty set. The network device may obtain channel states of the port 1 and the port 2 by using the second reference signal, and may obtain channel states of the port 3 and the port 4 by using a feedback from the terminal device. In another possible embodiment, the second antenna port set may include one of the port 3 and the port 4, and the first antenna port set includes the port 1 and the port 2. In this case, the intersection set of the first antenna port set and the second antenna port set is an empty set. This is because the network device may determine a quantity of layers of data to be scheduled for each terminal device. If the network device determines that a maximum of three layers of data (it is assumed that the three layers of data correspond to the port 1, the port 2, and the port 3) are currently scheduled for the terminal device, after channel states of the port 1 and the port 2 are obtained by using the second reference signal, only channel state information of another port (that is, the port 3) may need to be obtained. This manner may cause a performance loss to some extent, but can reduce reporting overheads.

In another possible embodiment, the first antenna port set includes the port 1 and the port 2, and the second antenna port set includes the port 1, the port 3, and the port 4. In this case, there is an intersection set between the first antenna port set and the second antenna port set, but the first antenna port set and the second antenna port set are different. In this case, the network device may obtain a channel state of the port 1 by using the second reference signal. However, the network device determines that a signal-to-noise ratio (SNR) of a channel of the port 1 is excessively low. Therefore, the channel state of the port 1 that is obtained by measuring the second reference signal is inaccurate. In this case, the terminal device may be instructed to report channel state information of the port 1 by measuring the first reference signal, to reconstruct a more accurate channel.

If the terminal device supports an antenna selection function, the PAs may be respectively connected to the port 1 and the port 2 at one moment and respectively connected to the port 3 and the port 4 at another moment through switching by using switches. In a possible embodiment, the first antenna port set includes the port 1 the port 2, the port 3, and the port 4, and the second antenna port set includes the port 3 and the port 4. In this case, the intersection set of the first antenna port set and the second antenna port set is not an empty set, but the first antenna port set and the second antenna port set are different. In an application scenario, the terminal device periodically uses the port 1 and the port 2 to send the second reference signal at moments $n_1+T$, $n_1+2T$, ..., and the like, and periodically uses the port 3 and the port 4 to send the second reference signal at moments $n_2+T$ and $n_2+2T$. At a moment $n_3$, the network device determines to trigger the terminal device to report CSI. In this case, assuming that the second reference signal closest to the moment $n_3$ is sent by the terminal device by using the port 1 and the port 2, channel state information of the port 1 and the port 2 can still be used, but channel state information of the port 3 and the port 4 is too old to be used. Therefore, the network device may trigger the terminal device to report the channel state information corresponding to the port 3 and the port 4, thereby improving accuracy of reconstructing a channel.

In the foregoing application scenario, in an alternative definition, the second antenna port set may include the port 3 and the port 4, and the first antenna port set includes the port 1 and the port 2. In this definition manner, ports whose channel state information is obtained by the network device by using the feedback from the terminal device constitute the second antenna port set, and ports whose channel state information is obtained only by measuring the second reference signal constitute the first antenna port set. In this case, the intersection set of the first antenna port set and the second antenna port set is an empty set.

It should be understood that, in this application, specific definitions of the second antenna port set and the first antenna port set are not limited, and only a difference between the second antenna port set and the first antenna port set is constrained.

In an optional embodiment, the first indication information is a wideband parameter, or the first indication information is a subband parameter.

Specifically, if the first indication information is a wideband parameter, the terminal device needs to report only one piece of first indication information for an entire CSI reporting bandwidth. If the first indication information is a subband parameter, the terminal device needs to report one piece of first indication information for each subband in the CSI reporting bandwidth.

In an optional embodiment, the channel state information of the first antenna port set includes first amplitude information associated with a channel matrix $G_u$ of the first antenna port set; and/or the channel state information of the second antenna port set includes second amplitude information associated with a channel matrix $G_d$ of the second antenna port set, where $G_d$ is a matrix with m rows and M columns, $G_u$ is a matrix with x rows and M columns, and M is a positive integer.

Specifically, the channel matrix $G_u$ of the first antenna port set is a matrix including channel vectors corresponding to all or some antenna ports in the first antenna port set. A specific form may be as follows: Assuming that a channel vector corresponding to an $i^{th}$ port in the first antenna port set is represented as $G_{u,i}$, $G_{u,i}=[g_{u,i,1} \ g_{u,i,2} \cdots g_{u,i,M}] \in C^{1 \times M}$, where $g_{u,i,j}$ represents a channel coefficient between a $j^{th}$ antenna port of the network device and the $i^{th}$ antenna port, and is a complex number. In this case, all antenna ports are used as an example, and a matrix including channel vectors corresponding to all the antenna ports in the first antenna port set is represented as $$G_u = \begin{bmatrix} G_{u,1} \\ \cdots \\ G_{u,x} \end{bmatrix} \in C^{x \times M}.$$

x represents a quantity of the ports included in the first antenna port set, and M is a quantity of ports used by the network device to send the first reference signal. An expression form of a matrix $G_u$ including channel vectors corresponding to some antenna ports in the first antenna port set is similar. In this case, a quantity of rows of $G_u$ is a quantity of antenna ports in the some antenna ports.

Similarly, the channel matrix $G_d$ of the second antenna port set is a matrix including channel vectors corresponding to all or some ports in the second antenna port set. A specific form may be as follows: Assuming that a channel vector corresponding to an $i^{th}$ port in the second antenna port set is represented as $G_{d,i}$, $G_{d,i}=[g_{d,i,1} \ g_{d,i,2} \cdots g_{d,i,M}]$, where $g_{d,i,j}$ represents a channel coefficient between a $j^{th}$ antenna port of the network device and the $i^{th}$ antenna port, and is a complex number. In this case, all ports are used as an example, and a matrix including channel vectors corresponding to all the antenna ports in the second antenna port set is represented as $$G_d = \begin{bmatrix} G_{d,1} \\ \ldots \\ G_{d,m} \end{bmatrix} \in C^{m \times M}.$$

m represents a quantity of the ports included in the second antenna port set, and M is a quantity of ports used by the network device to send the first reference signal. An expression form of a matrix $G_d$ including channel vectors corresponding to some antenna ports in the second antenna port set is similar. In this case, a quantity of rows of $G_d$ is a quantity of antenna ports in the some antenna ports.

The terminal device may obtain the matrix $G_u$ and the matrix $G_d$ based on measurement of the first reference signal.

The first amplitude information associated with $G_u$ may be amplitude information of an element in the channel matrix $G_u$, or may be amplitude information obtained after all or some elements of $G_u$ are processed. The second amplitude information associated with $G_d$ may be amplitude information of an element in the channel matrix $G_d$, or may be amplitude information obtained after all or some elements of $G_d$ are processed. This is not limited in this embodiment of this application. It should be understood that the first amplitude information may be subband amplitude information or wideband amplitude information, and the second amplitude information may be subband amplitude information or wideband amplitude information. This is not limited in this embodiment of this application.

The first amplitude information associated with $G_u$ is used as an example. The first amplitude information may be an amplitude function. For example, the first amplitude information may be an amplitude, a power, or a value obtained after the amplitude or the power is transformed to another domain (for example, a dB domain), for example, transformed from a linear domain to the dB domain, where $X(dB)=20 \log_a(X)$ or $X(dB)=10 \log_a(X)$, a is a natural number, and X is a value of the linear domain. Alternatively, the first amplitude information may be an amplitude, a power, or a value obtained after the amplitude or the power is transformed to the dB domain and processed (for example, normalized or quantized). This is not limited in this embodiment of this application.

Optionally, the first amplitude information may be a function of amplitude information of an element in $G_u$. Optionally, the first amplitude information may be a function of amplitude information of all or some elements of $G_u$.

The channel state information of the second antenna port set is similar to the channel state information of the first antenna port set. Details are not described herein again.

In this embodiment of this application, the first indication information may be a wideband parameter, or may be a subband parameter.

If the first indication information is a wideband parameter, the first amplitude information and the second amplitude information are each wideband amplitude information. In a possible embodiment, on each subband, amplitudes of (all or some) elements of a channel matrix $G_d$ of the second antenna port set or (all or some) elements of a matrix $W_{2,d}$ corresponding to $G_d$ are jointly represented by wideband amplitudes and subband differential amplitudes. In this case, when reporting $G_d$, the terminal device may normalize the wideband amplitudes of the all or some elements by using the first amplitude information as a reference, and normally report the subband differential amplitudes. In another possible embodiment, on each subband, amplitudes of all or some elements of $G_d$ or all or some elements of $W_{2,d}$ are directly represented by using subband amplitudes, and are not split in a form of wideband amplitudes and subband differential amplitudes. In this case, when reporting $G_d$, the terminal device may normalize the subband amplitudes of the all or some elements by using the first amplitude information as a reference. Correspondingly, an operation performed by the network device on the channel matrix $G_u$ of the first antenna port set is similar to an operation performed by the terminal device on $G_d$. Details are not described herein again.

If the first indication information is a subband parameter, the first amplitude information and the second amplitude information are each subband amplitude information. In a possible embodiment, on each subband, amplitudes of (all or some) elements of $G_d$ or (all or some) elements of $W_{2,d}$ are directly represented by using subband amplitudes, and are not divided in a form of wideband amplitudes and subband differential amplitudes. In this case, when reporting $G_d$, the terminal device may normalize the subband amplitudes of the foregoing elements by using a subband amplitude of the first amplitude information as a reference. Correspondingly, an operation performed by the network device on the channel matrix $G_u$ of the first antenna port set is similar to an operation performed by the terminal device on $G_d$. Details are not described herein again.

In a possible embodiment, the channel state information is power information, and a power is a square of an amplitude. Therefore, it may also be understood that the channel state information is a function of the amplitude.

In an optional embodiment, the first amplitude information is determined based on any one of the following elements:

an element whose amplitude information has a largest value in at least one row of elements of $G_u$, an element whose amplitude information has a largest value in at least one column of elements of a matrix $W_{2,u}$ corresponding to $G_u$, a singular value whose amplitude information has a largest value in at least one singular value of $G_u$, or an eigenvalue whose amplitude information has a largest value in at least one eigenvalue of $G_u$; and/or the second amplitude information is determined based on any one of the following elements:

an element whose amplitude information has a largest value in at least one row of elements of $G_d$, an element whose amplitude information has a largest value in at least one column of elements of a matrix $W_{2,d}$ corresponding to $G_d$, an eigenvalue whose amplitude information has a largest value in at least one eigenvalue of $G_d$, or a singular value whose amplitude information has a largest value in at least one singular value of $G_d$, where $G_u^T(1_u)=W_1 \times W_{2,u}(1_u)$, $G_d^T(1_d)=W_1 \times W_{2,d}(1_d)$, $X^T$ represents transposition of a matrix X, $X(1_u)$ represents an $1_u^{th}$ column of the matrix X, $X(1_d)$ represents an $1_d^{th}$ column of the matrix X, $W_1$ is an M*N matrix, $W_{2,u}$ is an N*x matrix, $W_{2,d}$ is an N*m matrix, N is a positive integer, $1_u \in \{1, 2, \ldots, x\}$, and $1_d \in \{1, 2, \ldots, m\}$.

In an optional embodiment, the first amplitude information is determined based on an element whose amplitude information has a largest value in at least one row of elements of $G_u$, and the second amplitude information is determined based on an element whose amplitude information has a largest value in at least one row of elements of $G_d$.

In an optional embodiment, the first amplitude information is determined based on an element whose amplitude information has a largest value in at least one column of elements of a matrix $W_{2,u}$ corresponding to $G_u$, and the second amplitude information is determined based on an element whose amplitude information has a largest value in at least one column of elements of a matrix $W_{2,d}$ corresponding to $G_d$, where $G_u^T(l_u)=W_1\times W_{2,u}(l_u)$, $G_d^T(l_d)=W_1\times W_{2,d}(l_d)$, $X^T$ represents transposition of a matrix X, $X(l_u)$ represents an $l_u^{th}$ column of the matrix X, $X(l_d)$ represents an $l_d^{th}$ column of the matrix X, $W_1$ is an M*N matrix, $W_{2,u}$ is an N*x matrix, $W_{2,d}$ is an N*m matrix, N is a positive integer, $l_u \in \{1, 2, \ldots, x\}$ and $l_d \in \{1, 2, \ldots, m\}$.

In this embodiment of this application, $W_1$ is a block diagonal matrix, $$W_1 = \begin{bmatrix} A & 0 \\ 0 & A \end{bmatrix},$$

$A=[b_1,b_2,L\ b_L]$ includes L basis vectors, and N=2L. Specifically, $W_1$ is a wideband parameter, and $W_{2,u}$ and $W_{2,d}$ each include wideband parameters (for example, wideband amplitudes) and subband parameters (for example, a subband differential amplitude and a subband phase); or $W_{2,u}$ and $W_{2,d}$ each include subband parameters (for example, a subband amplitude and a subband phase). The terminal device may represent $G_u$ and $G_d$ by feeding back an index of a parameter of $W_1$ and an index of a parameter of $W_2$.

In an optional embodiment, the first amplitude information is determined based on an element whose amplitude information has a largest value in at least one row of elements of $G_u$, and the second amplitude information is determined based on an element whose amplitude information has a largest value in at least one column of elements of a matrix $W_{2,d}$ corresponding to $G_d$, where $G_d^T(t_d)=W_1\times W_{2,d}(l_d)$, $X^T$ represents transposition of a matrix X, $X(l_d)$ represents an $l_d^{th}$ column of the matrix X, $W_1$ is an M*N matrix, $W_{2,d}$ is an N*m matrix, N is a positive integer, and $l_d \in \{1, 2, \ldots, m\}$.

In this embodiment, the first amplitude information is directly determined based on the channel matrix $G_u$, so that the terminal device can be prevented from decomposing $G_u$ by using a double codebook structure, and the network device does not need to decompose the uplink channel matrix by using the double codebook structure when reconstructing a complete channel state matrix. In this way, complexity of the network device and the terminal device is reduced while accurate channel state information can be obtained.

In an optional embodiment, the first amplitude information is determined based on a singular value whose amplitude information has a largest value in at least one singular value of $G_u$, and the second amplitude information is determined based on a singular value whose amplitude information has a largest value in at least one singular value of $G_d$.

In an optional embodiment, the first amplitude information is determined based on an eigenvalue whose amplitude information has an eigenvalue in at least one eigenvalue of $G_u$, and the second amplitude information is determined based on an eigenvalue whose amplitude information has a largest value in at least one eigenvalue of $G_d$.

In an optional embodiment, the first amplitude information is amplitude information of a first element, and the first element is an element in $G_u$, an element in a matrix $W_{2,u}$ corresponding to $G_u$, a singular value of $G_u$, or an eigenvalue of $G_u$; and/or the second amplitude information is amplitude information of a second element, and the second element is an element in $G_d$, an element in a matrix $G_d$ corresponding to $W_{2,d}$, a singular value of $G_d$, or an eigenvalue of $G_d$.

In an optional embodiment, the first amplitude information is determined based on an element whose amplitude information has a largest value in at least one row of elements of $G_u$, or the first amplitude information is amplitude information of a first element, and an index of the first element is predefined; and the second amplitude information includes n sub-elements, an $i^{th}$ sub-element in the n sub-elements is determined based on an element whose amplitude information has a largest value in M elements in an $i^{th}$ row in n rows of $G_d$, n is a positive integer, and $i \in \{1, 2, \ldots, n\}$.

In an optional embodiment, the first amplitude information is determined based on an element whose amplitude information has a largest value in at least one column of elements a matrix $W_{2,u}$ corresponding to $G_u$, or the first amplitude information is amplitude information of a first element, and an index of the first element is predefined; and the second amplitude information includes n sub-elements, an $i^{th}$ sub-element in the n sub-elements is determined based on an element whose amplitude information has a largest value in N elements in an $i^{th}$ column inn columns of a matrix $W_{2,d}$ corresponding to $G_d$, n is a positive integer, and $i \in \{1, 2, \ldots, n\}$, where $G_u^T(l_u)=W_1\times W_{2,u}(l_u)$, $G_d^T(l_d)=W_1\times W_{2,d}(l_d)$, $X^T$ represents transposition of a matrix X, $X(l_u)$ represents an $l_u^{th}$ column of the matrix X, $X(l_d)$ represents an $l_d^{th}$ column of the matrix X, $W_1$ is an M*N matrix, $W_{2,u}$ is an N*x matrix, $W_{2,d}$ is an N*m matrix, N is a positive integer, $l_u \in \{1, 2, \ldots, x\}$ and $l_d \in \{1, 2, \ldots, m\}$.

In a possible embodiment, n is greater than or equal to 2.

In an optional embodiment, at least one row of $G_d$ includes n rows, n is a positive integer, and the method further includes:

The terminal device sends second indication information. The second indication information is used to indicate differential values between amplitude information of n−1 third elements other than the second element in n third elements and amplitude information of the second element. An $i^{th}$ third element in the n third elements is determined based on an element whose amplitude information has a largest value in M elements in an $i^{th}$ row in the n rows. The second amplitude information is determined based on the amplitude information of the second element.

In an optional embodiment, at least one column in the matrix $W_{2,d}$ includes n columns, n is a positive integer, and the method further includes:

The terminal device sends third indication information. The third indication information is used to indicate differential values between amplitude information of n−1 fourth elements other than the second element in n fourth elements and amplitude information of the second element. An $i^{th}$ fourth element in the n fourth elements is determined based on an element whose amplitude information has a largest value in N elements in an $i^{th}$ column in the n columns. The second amplitude information is determined based on the amplitude information of the second element.

In an optional embodiment, the method further includes: The terminal device sends fourth indication information, and the fourth indication information is used to indicate an index of the first element and/or an index of the second element.

In an optional embodiment, the index of the first element is predefined; and/or the index of the second element is predefined.

In an optional embodiment, the first amplitude information is determined based on amplitude information of at least two elements of $G_u$; or the first amplitude information is determined based on amplitude information of at least two elements of a matrix $W_{2,u}$ corresponding to $G_u$; and/or the second amplitude information is determined based on amplitude information of at least two elements of $G_d$; or the second amplitude information is determined based on amplitude information of at least two elements of a matrix $W_{2,d}$ corresponding to $G_d$, where $G_u^T(1_u)=W_1 \times W_{2,u}(1_u)$, $G_d^T(1_d)=W_1 \times W_{2,d}(1_d)$, $X^T$ represents transposition of a matrix X, $X(1_u)$ represents an $1_u^{th}$ column of the matrix X, $X(1_d)$ represents an $1_d^{th}$ column of the matrix X, $W_1$ is an M*N matrix, $W_{2,u}$ is an N*x matrix, $W_{2,d}$ is an N*m matrix, N is a positive integer, $1_u \in \{1, 2, \ldots, x\}$, and $1_d \in \{1, 2, \ldots, m\}$.

Specifically, the determining based on the amplitude information may be determining based on a function of the amplitude information of the at least two elements. Optionally, the foregoing function may be a sum of the amplitude information of the at least two elements, or may be an average value (for example, an arithmetic average value, a geometric average value, a root-mean-square average value, or a weighted average value) of the amplitude information of the at least two elements. Further, the average value of the amplitude information of the elements may be an average value of wideband amplitude information or an average value of subband amplitude information.

A function of amplitude information of all elements is used below as an example for description. An arithmetic average value is used as an example, and an average amplitude value of all elements of a matrix X of a rows and b columns is defined as $$|X|_{avg} = \frac{1}{ab}\sum_{i=1}^{a}\sum_{j=1}^{b}|X_{ij}|^p,$$

where $|X_u|$ represents an amplitude of an element in an $i^{th}$ row and a $j^{th}$ column of X, and p is a natural number.

Optionally, an average value of the wideband amplitude information of all the elements of $G_u$ is $$\frac{1}{F}\sum_{f=1}^{F}|G_u(f)|_{avg}, \text{ or}$$

$$\sqrt[p]{\frac{1}{F}\sum_{f=1}^{F}|G_u(f)|_{avg}}, \text{ or}$$

$$\frac{1}{xM}\sum_{i=1}^{x}\sum_{j=1}^{M}(|(G_u)_{i,j}|_{WB})^p, \text{ or}$$

$$\sqrt[p]{\frac{1}{xM}\sum_{i=1}^{x}\sum_{j=1}^{M}(|(G_u)_{i,j}|_{WB})^p}.$$

$G_u$ (f) is a value of $G_u$ on an $f^{th}$ subband, and an entire CSI reporting bandwidth includes F subbands. $|(G_u)_{i,j}|_{WB}$ represents a wideband amplitude value of an element in an $i^{th}$ row and a $j^{th}$ column of $G_u$, and p is a natural number.

Optionally, an average value of subband amplitude information of all elements of $G_u$ on the $f^{th}$ subband is $|G_u(f)|_{avg}$.

Definitions of wideband amplitude information and subband amplitude information of all elements of $G_d$ are similar to those of $G_u$. Details are not described herein again.

In an optional embodiment, the first amplitude information is determined based on an average value of amplitude information of at least two elements of a matrix $W_{2,u}$ corresponding to $G_u$, and the second amplitude information is determined based on an average value of amplitude information of at least two elements of a matrix $W_{2,d}$ corresponding to $G_d$, where $G_u^T(1_u)=W_1 \times W_{2,u}(1_u)$, $G_d^T(1_d)=W_1 \times W_{2,d}(1_d)$, $X^T$ represents transposition of a matrix X, $X(1_u)$ represents an $1_u^{th}$ column of the matrix X, $X(1_d)$ represents an $1_d^{th}$ column of the matrix X, $W_1$ is an M*N matrix, $W_{2,u}$ is an N*x matrix, $W_{2,d}$ is an N*m matrix, N is a positive integer, $1_u \in \{1, 2, \ldots, x\}$, and $1_d \in \{1, 2, \ldots, m\}$.

Optionally, an average value of wideband amplitude information of all elements of $W_{2,u}$ is $$\frac{1}{F}\sum_{f=1}^{F}|W_{2,u}(f)|_{avg} \text{ or}$$

$$\sqrt[p]{\frac{1}{F}\sum_{f=1}^{F}|W_{2,u}(f)|_{avg}},$$

where p is a natural number, or $$\frac{1}{xM}\sum_{i=1}^{x}\sum_{j=1}^{M}(|(W_{2,u})_{i,j}|_{WB})^p, \text{ or}$$

$$\sqrt[p]{\frac{1}{xM}\sum_{i=1}^{x}\sum_{j=1}^{M}(|(W_{2,u})_{i,j}|_{WB})^p}.$$

Optionally, an average value of subband amplitude information of all elements of $W_{2,u}$ on the $f^{th}$ subband is $|W_{2,u}(f)|_{avg}$.

Definitions of wideband amplitude information and subband amplitude information of all elements of $W_{2,u}$ are similar to those of $W_{2,u}$. Details are not described herein again.

It should be understood that the foregoing determining based on the average value may include determining based on the average value, or may include determining based on a function of the average value, for example, determining based on a sum value of amplitude information of all or some elements. The sum value is a multiple of the average value. This is not limited in this embodiment of this application.

It should be understood that the average value mentioned in this embodiment of this application may be an arithmetic average value, or may be a geometric average value, a root-mean-square average value, or a weighted average value. This is not limited in this embodiment of this application.

In an optional embodiment, the first amplitude information is determined based on a sum of amplitude information of at least two elements of $G_u$, and the second amplitude information is determined based on a sum of amplitude information of at least two elements of $G_d$; or the first amplitude information is determined based on a sum of amplitude information of at least two elements of a matrix $W_{2,u}$ corresponding to $G_u$, and the second amplitude information is determined based on a sum of amplitude information of at least two elements of a matrix $W_{2,d}$ corresponding to $G_d$.

Further, a weighted sum of the amplitude information of the at least two elements may be a weighted sum of wideband amplitude information or a weighted sum of subband amplitude information. The foregoing determining based on the sum may include determining based on the sum value of the amplitude information, or may include determining based on a function of the sum value, for example, determining based on a sum value of the amplitude information of the at least two elements. The amplitude information is a multiple of the sum value. This is not limited in this embodiment of this application.

In an optional embodiment, the first amplitude information is determined based on norm information of $G'_u$, and the second amplitude information is determined based on norm information of $G'_d$. $G'_u$ includes at least two elements of $G_u$, and $G'_d$ includes at least two elements of $G_d$.

It should be understood that the norm information of the matrix $G'_u$ may be a function of a subband p-norm of $G'_u$, or may be a function of a wideband p-norm of $G'_u$, or may be a function of an average value of a subband p-norm. This is not limited in this embodiment of this application. p is a natural number. Specifically, the p-norm may be a Frobenius norm. $G'_u = G_u$ is used as an example below for description. A p-norm of a matrix X with a rows and b columns is $$|X|_p = \left(\sum_{i=1}^{a}\sum_{j=1}^{b}|X_{ij}|^p\right)^{\frac{1}{p}},$$

where $X_{ij}$ represents an element in an $i^{th}$ row and a $j^{th}$ column of X.

Optionally, the function of the p-norm may be a $p^{th}$ power of the p-norm:

$$\sum_{i=1}^{a}\sum_{j=1}^{b}|X_{ij}|^p.$$

Optionally, a wideband p-norm of $G_u$ may be defined as $$\frac{1}{F}\sum_{f=1}^{F}|G_u(f)|_p \text{ or}$$

$$\left(\frac{1}{F}\sum_{f=1}^{F}(|G_u(f)|_p)^p\right)^{\frac{1}{p}},$$

where $G_u(f)$ is a value of $G_u$ on an $f^{th}$ subband, and an entire CSI reporting bandwidth includes F subbands.

Optionally, a wideband p-norm of $G_u$ may be defined as $$\left(\sum_{i=1}^{x}\sum_{j=1}^{M}(|(G_u)_{i,j}|_{WB})^p\right)^{\frac{1}{p}},$$

where $|(G_u)_{i,j}|_{WB}$ represents a wideband amplitude value of an element in an $i^{th}$ row and a $j^{th}$ column of $G_u$.

Norm information of $G_d$ is similar to the norm information of $G_u$. Details are not described herein again.

In an optional embodiment, the first amplitude information is determined based on norm information of a matrix $W_{2,u}$ corresponding to $G'_u$, and the second amplitude information is determined based on norm information of a matrix $W_{2,d}$ corresponding to $G'_d$, where $G'^T_u(1_u) = W_1 \times W_{2,u}(1_u)$ $G'^T_d(1_d) = W_1 \times W_{2,d}(1_d)$, $X^T$ represents transposition of a matrix X, $X(1_u)$ represents an $1_u^{th}$ column of the matrix X, $X(1_d)$ represents an $1_d^{th}$ column of the matrix X, $W_1$ is an M*N matrix, $W_{2,u}$ is an N*x matrix, $W_{2,d}$ is an N*m matrix, N is a positive integer, $1_u \in \{1, 2, \ldots, x\}$, and $1_d \in \{1, 2, \ldots, m\}$.

It should be understood that the norm information of the matrix $W_{2,u}$ may be a function of a subband p-norm of $W_{2,u}$, or may be a function of a wideband p-norm of $W_{2,u}$, or may be a function of an average value of a subband p-norm. This is not limited in this embodiment of this application. p is a natural number. Specifically, a definition of the p-norm is similar to the foregoing definition, and details are not described herein again.

In an optional embodiment, the first antenna port set is predefined, or is determined by the terminal device based on a configuration of the network device, or is determined based on a terminal capability reported by the terminal device; and/or the second antenna port set is predefined, or is determined by the terminal device based on a configuration of the network device, or is determined based on a terminal capability reported by the terminal device.

Specifically, the first antenna port set may be predefined, or may be configured by the network device for the terminal device (that is, determined by the terminal device based on a configuration of the network device), or may be determined by the terminal device based on a capability of the terminal device. This is not limited in this embodiment of this application. Similarly, the second antenna port set may be predefined, or may be configured by the network device for the terminal device (that is, determined by the terminal device based on a configuration of the network device), or may be determined by the terminal device based on a capability of the terminal device. This is not limited in this embodiment of this application.

In a possible embodiment, the first antenna port set and the second antenna port set may be predefined. For example, in an alternative definition, an antenna port that is used to send the second reference signal for k times closest to a moment at which the network device triggers the terminal device to report the channel state information constitutes the first antenna port set, remaining other antenna ports in y antenna ports of the terminal device are the second antenna port set, and k is a positive integer.

In another possible embodiment, the first antenna port set and the second antenna port set may be determined based on a configuration of the network device. For example, the network device may indicate, by using configuration information, antenna ports that are used by the terminal device to report the channel state information. In this case, these antenna ports are the second antenna port set, and remaining other antenna ports in y antenna ports of the terminal device constitute the first antenna port set. For another example, the network device may indicate antenna ports that do not correspond to the channel state information reported by the terminal device. In this case, these antenna ports constitute the first antenna port set, and other antenna ports constitute the second antenna port set. It should be understood that a specific indication manner may be direct indication or indirect indication. This is not limited in this embodiment of this application. If direct indication is used, the network device may indicate a port number of an antenna port. If indirect indication is used, the network device may indicate a port quantity of antenna ports.

In another possible embodiment, the first antenna port set and the second antenna port set may be determined based on a terminal capability, and the terminal capability may be reported by the terminal device to the network device. For example, if the terminal device reports that the terminal device has two transmit antennas and four receive antennas (2T4R), the first antenna port set includes two of the four antenna ports, and the second antenna port set includes the other two antenna ports of the four antenna ports.

In an optional embodiment, the first antenna port set and/or the second antenna port set are/is determined by the terminal device by using configuration information carried in at least one of the following signaling sent by the network device: radio resource control RRC signaling, multiple access control MAC control element CE signaling, and downlink control information DCI signaling.

Specifically, if the first antenna port set and/or the second antenna port set are/is determined by the terminal device based on a configuration of the network device, the network device may send at least one of radio resource control (RRC) signaling, multiple access control (MAC) control element (CE) signaling, and downlink control information (DCI) signaling to the terminal device, to configure the first antenna port set and/or the second antenna port set. The following describes several cases in detail. However, it should be understood that the following cases are merely examples, and do not constitute any impact on the protection scope of the embodiments of this application.

(1) RRC: The network device may indicate, by using the RRC signaling, the configuration information reported by using the channel state information. The configuration information may be directly used to determine the first antenna port set and/or the second antenna port set. The terminal device receives the configuration information, and may determine the first antenna port set and/or the second antenna port set based on the configuration information. Optionally, reporting of the channel state information is periodic.

(2) RRC+DCI: The network device may indicate, by using the RRC signaling, configuration information reported by using the channel state information. The configuration information may be used to determine the first antenna port set and/or the second antenna port set. The network device triggers, by using the DCI signaling, the terminal device to report the channel state information. Optionally, reporting of the channel state information is non-periodic or semi-persistent (semi-persistent).

(3) RRC+DCI: The terminal device is 2T4R and supports antenna selection. The network device may indicate, by using the RRC signaling, configuration information reported by using the channel state information. The configuration information may be used to determine that the second antenna port set includes all of the four antenna ports of the terminal device. Because the second reference signal is sent by using only two antenna ports each time, the network device may select, by using the DCI signaling, two of the four antenna ports that are not to be used for reporting this time or that are to be used for reporting this time. For example, numbers of the four ports are 0, 1, 2, and 3 respectively. The network device may select, by using the DCI signaling, the port 1 and the port 2 as ports to be used for the current reporting, so that the terminal device determines that the current first antenna port set includes the port 1 and the port 2, and that the current second antenna port set includes the port 3 and the port 4.

In this embodiment of this application, a relatively large set is configured by using RRC signaling, and a subset in the set is selected as the first antenna port set by using the DCI signaling, so that an implementation is more flexible, and a quantity of pieces of channel state information reported in an RRC configuration can be reduced. For example, if channel SNRs of two of the four antenna ports of the terminal device are relatively low, SRS measurement of the two antenna ports is very inaccurate, resulting in inaccurate precoding of downlink data. Channel state feedbacks of the two antenna ports are triggered by using the DCI signaling, so that accuracy of channel information of the two ports can be improved.

(4) RRC+MAC CE+DCI: The network device may send configuration information by using the RRC signaling, to indicate a plurality of possible antenna port sets, and then select, by using the MAC CE signaling, some antenna port sets from the plurality of possible antenna port sets as candidate sets, and finally select, by using the DCI signaling, an antenna port set from the candidate sets as the first antenna port set and/or the second antenna port set corresponding to the current reporting.

In an optional embodiment, the first reference signal is a channel state information-reference signal CSI-RS; and/or the second reference signal is a sounding reference signal SRS.

For ease of understanding, the following describes this application in detail with reference to specific embodiments. In the following embodiment, an intersection set of the first antenna port set and the second antenna port set is an empty set. However, it should be understood that a principle of the example in which the intersection set of the first antenna port set and the second antenna port set is not an empty set is the same as that of the example in which the intersection set of the first antenna port set and the second antenna port set is an empty set, and examples are not listed one by one herein.

The terminal device has a total of x+m receive antenna ports, where x ports may also be used as transmit antenna ports, and the other m ports cannot be used as transmit antenna ports. In this embodiment, the m ports are referred to as non-transmit antenna ports. The terminal device sends an SRS by using the x antenna ports (namely, the foregoing first antenna port set), and the network device obtains a channel matrix $$G_{srs} = \sqrt{P_{srs}} H_u = \sqrt{P_{srs}} \begin{bmatrix} H_{u,1} \\ \ldots \\ H_{u,x} \end{bmatrix} \in C^{x \times M}$$

of the x transmit antenna ports, where $H_{u,i} \in C^{1 \times M}$ (i=1, ..., x) represents a channel vector between the network device and an $i^{th}$ transmit antenna port, $\sqrt{P_{srs}}$ represents a power factor related to sending of the SRS by the terminal device, and m represents a quantity of antenna ports of the network device. Optionally, the x antenna ports for sending the SRS may be configured by the network device.

The network device may send a CSI-RS by using M antenna ports, and the terminal device estimates a downlink channel matrix $$G_{csi-rs} = \begin{bmatrix} G_{csi-rs,u} \\ G_{csi-rs,d} \end{bmatrix} = \sqrt{P_{csi-rs}} \begin{bmatrix} H_u \\ H_d \end{bmatrix}$$

from the network device to the x+m receive antenna ports of the terminal device by measuring the CSI-RS.

$$H_d = \begin{bmatrix} H_{d,1} \\ \ldots \\ H_{d,y-x} \end{bmatrix} \in C^{m \times M}$$

includes a downlink channel vector of m antenna ports (namely, the second antenna port set) from the network device to the terminal device, and $\sqrt{p_{csi-rs}}$ represents a power factor related to sending of the CSI-RS by the network device. In this embodiment of this application, $G_{csi-rs,u}$ is the foregoing $G_u$, and $G_{csi-rs,d}$ is the foregoing $G_d$.

The information reported by the terminal device may be classified into the following several cases:

Embodiment 1

The terminal device feeds back related information of a channel matrix $G_{csi-rs,d}$ by using an explicit feedback method. For example, the terminal device feeds back channel vectors of the m non-transmit antenna ports and relative power values (namely, the first indication information) between channels of the m non-transmit antenna ports and the channel of the x transmit antenna ports element by element. A specific feedback manner is as follows.

(1) The terminal device may determine, based on CSI-RS measurement, a wideband amplitude value $a_{l_1}$ of an element whose location is $l_1$ in x channel vectors corresponding to the first antenna port set. Optionally, $l_1$ may be predefined, or may be selected by the terminal device. If $l_1$ is selected by the terminal device, the terminal device needs to report information about $l_1$, that is, $PMI_{1,0}$.

(2) For m elements included in a channel vector $H_{d,i}$ corresponding to an $i^{th}$ antenna port in the m non-transmit antenna ports in the second antenna port set, where, the terminal device may report at least one of the following information:

a wideband feedback $PMI_{1,1,i}$, indicating an element location with a largest wideband amplitude in the M elements of $H_{d,i}$, where the element location is denoted as $l_{2,i}$;

a wideband feedback $PMI_{1,2,i}$ indicating a ratio of a wideband amplitude $|H_{d,i}(l_{2,i})|_{WB}$ of an element of $H_{d,i}$ at a location $l_{2,i}$ to $a_{l_1}$, where the ratio is denoted as $x_{l2,i}$ (that is, some content indicated by the first indication information);

a wideband feedback $PMI_{1,3,i}$, indicating a ratio of a wideband amplitude of each of elements of $H_{d,i}$ at remaining M-1 locations to $|H_{d,i}(l_{2,i})|_{WB}$, where the ratio is denoted as $y_{i,j}$ ($j \in \{1, 2, \ldots, M\}$; and a subband feedback $PMI_{2,i}$, indicating a subband differential amplitude $z_{i,j}$ and a subband phase $u_{i,j}$ of M elements of $H_{d,i}$ on each subband.

All the foregoing amplitudes and phases may be quantized. Specifically, a quantization range of the wideband amplitude ratio $x_{l2,i}$ may be [-X, X] dB, where X is a positive integer, and a quantization interval may be Y dB, that is, a quantized ratio is an element in a set {-X, -X+Y, -X+2Y, . . . , X-Y, X}.

A channel matrix that is corresponding to an $i^{th}$ port and that may be restored by the network device based on the PMI reported by the terminal device is:

$H_{d,i}' = [h'_{i,0} \ldots h'_{i,M-1}]$, where $h'_{i,l_{2,i}} = x_{l_{2,i}} z_{i,l_{2,i}} \exp(j2\pi u_{i,l_{2,i}})$ and $h'_{i,j} = x_{l_{2,i}} y_{i,j} z_{i,j} \exp(j2\pi u_{i,j})$ ($j \neq l_{2,i}$). In this case, $H_{d,i}$ does not include impact of a CSI-RS transmit power factor. Therefore, a channel matrix of the m antenna ports is obtained:

$$H_d' = \begin{bmatrix} H'_{d,1} \\ \ldots \\ H'_{d,M} \end{bmatrix}.$$

In addition, the network device normalizes, by using the wideband amplitude $G_{srs} = \sqrt{p_{srs}} H_u$ of the element at the location $l_1$ as a reference, all elements of $|G_{srs}(l_1)|_{WB}$ that are measured based on the SRS, to obtain $H'_u$. In this case, the matrix does not include impact of an SRS transmit power factor.

The network device reconstructs a complete channel matrix $$H' = \begin{bmatrix} H'_u \\ \ldots \\ H'_d \end{bmatrix}.$$

The network device may further obtain the precoding matrix of downlink data based on the channel matrix.

In this embodiment, $l_1$ and $l_{2,i}$ each indicate information related to a wideband amplitude. Therefore, the first indication information is a wideband parameter.

In this embodiment of this application, the normalized element location (h) is reported or predefined, and the differential value (that is, $x_{l2,i}$) between the channel information of the transmit antenna port and the non-transmit antenna port is reported, so that a problem of an inaccurate precoding matrix caused by different transmit power of an SRS and a CSI-RS in a feedback solution in which there is no channel reciprocity in a TDD system can be resolved.

Embodiment 2

The terminal device may feed back channel vectors of the m non-transmit antenna ports and differential values between channel information of the m non-transmit antenna ports and channel information of the x transmit antenna ports by using a double codebook structure. A specific feedback manner is as follows.

(1) reporting $PMI_{1,1}$, where $PMI_{1,1}$ indicates a group of DFT beams $b_0, \ldots, b_{I-1}$ selected for an entire bandwidth, these beams constitute a matrix $W_1$, $$W_1 = \begin{bmatrix} b_0, \ldots, b_{I-1} & \\ & b_0, \ldots, b_{I-1} \end{bmatrix},$$

and I is a positive integer;

(2) obtaining, based on the selected matrix $W_1$, a matrix $W_{2,i}(f)$ of a downlink channel vector $G_{csi-rs,d}(f,i)$ ($G_{csi-rs,d}(f,i)$ representing an $i^{th}$ row of $G_{csi-rs,d}$ on an $f^{th}$ subband) of an $i^{th}$ port in the m non-transmit antenna ports on the $f^{th}$ subband, so that $G_{csi-rs,d}(f,i)^T = W_1 W_{2,i}(f)$, where for ease of representation, an identifier of the subband f is ignored below, and a form of the matrix $W_{2,i}$ is $W_{2,i} = [c_{i,0}, \ldots, c_{i,2I-1}]^T$, including 2I linear combination coefficients ($i=1, \ldots, m$); and (3) selecting an element in $G_{csi-rs,u}$ on the entire bandwidth, where a location of the element is $l_1$, and a value range of $l_1$ is 0 to x*M.

The terminal device may report at least one of the following information:

(3.1) a wideband feeds back a $PMI_{1,0}$, where the $PMI_{1,0}$ indicates a location $l_1$ of an element of $G_{csi-rs,u}$ on the entire bandwidth, optionally, $l_1$ may be predefined, and in this case, the terminal device does not need to report $PMI_{1,0}$;

(3.2) a wideband feedback $PMI_{l,i}I$, indicating a location $W_{2,i}$ of an element with a largest wideband amplitude in $2I$ elements of an $i^{th}$ matrix $l_{2,i}$;

(3.3) a wideband feedback $PMI_{1,2,i}$, where $PMI_{1,2,i}$ indicates a ratio of the wideband amplitude $|W_{2,i}(l_{2,i})|_{WB}$ of the element at the location $l_{2,i}$ in $W_{2,i}$ to $a_{l_1}$, and the ratio is denoted as $x_{l2,i}$;

(3.4) a wideband feedback $PMI_{1,3,i}$, indicating a ratio of a wideband amplitude y of each of elements of $W_{2,i}$ at remaining $2I-1$ locations to $W_{2,i}(l_{2,i})|_{WB}$, where the ratio is denoted as $y_{i,j}(j \in \{1, 2, \ldots M\})$; and In this step, an objective of power normalization by using $|W_{2,i}(l_{2,i})|_{WB}$ is to limit a value range of wideband amplitudes of the other $2I-1$ elements other than the element at the location $l_{2,i}$ to 0-1. A fixed quantization range facilitates quantization of these wideband amplitudes, and reduces a quantity of quantized bits.

All the foregoing amplitudes and phases may be quantized. Specifically, a quantization range of the wideband amplitude ratio $x_{l2,i}$ may be $[-X, X]$ dB, where X is a positive integer, and a quantization interval may be Y dB, that is, a quantized ratio is an element in a set $\{-X, -X+Y, -X+2Y, X-Y, X\}$.

(3.5) a subband feedback $PMI_{2,i}$, indicating a subband differential amplitude $z_{i,j}$ and a subband phase $u_{i,j}$ of M elements of $W_{2,i}$ on each subband.

The network device can reconstruct a complete channel matrix based on reporting of the terminal device. Specifically, the network device may normalize $G_{srs}$ based on $PMI_{1,0}$ by using a wideband amplitude value (which is assumed to be represented as $|b_{l_1}|$) of an element at a location $l_1$ in $G_{srs}$ as a reference, to eliminate impact of an SRS transmit power factor, to obtain $$H'_u = \frac{1}{|b_{l_1}|} G_{srs}.$$

Based on another PMI, the network device may restore a channel that is of an $i^{th}$ non-transmit antenna port and on which impact of the CSI-RS transmit power factor is eliminated:

$H'_{d,i} = W_1 W_{2,i}$, where $W_2 = [c_{i,0}, \ldots, c_{i,2I-1}]$, $c_{i,l_{2,i}} = x_{l_{2,i}} z_{i,l_{2,i}} \exp(j2\pi u_{i,l_{2,i}})$, $c_{i,j} = x_{l_{2,i}} y_{i,j} z_{i,j} \exp(j2\pi u_{i,j})$, and $(j \neq l_{2,i})$; and in this case, a complete channel matrix obtained by the network device is $$H' = \begin{bmatrix} H'_u \\ H'_d \end{bmatrix}.$$

In this case, the precoding matrix obtained by the network device based on the channel matrix is accurate, and is no longer affected by different transmit power factors of the SRS and the CSI-RS.

In this embodiment of this application, a dual codebook structure is used. The normalized element location ($l_1$) is reported or predefined, and the differential value (that is, $x_{l2,i}$) between the channel information of the transmit antenna port and the non-transmit antenna port is reported, so that a problem of an inaccurate precoding matrix caused by different transmit power of an SRS and a CSI-RS in a feedback solution in which there is no channel reciprocity in a TDD system can be resolved.

In addition, in this embodiment, the first amplitude information is directly determined based on the channel matrix $G_u$, so that the terminal device can be prevented from decomposing $G_u$ by using the double codebook structure, and the network device does not need to decompose the uplink channel matrix $G_{srs}$ by using the double codebook structure when reconstructing a complete channel state matrix. In this way, complexity of the network device and the terminal device is reduced while accurate channel state information can be obtained.

Embodiment 3

The terminal device may feed back channel vectors of the m non-transmit antenna ports and differential values between channel information of the m non-transmit antenna ports and channel information of the x transmit antenna ports by using a double codebook structure. A specific feedback manner is as follows.

(1) reporting $PMI_{1,1}$, where $PMI_{1,1}$ indicates a group of DFT beams $b_0, \ldots, b_{I-1}$ selected for an entire bandwidth, these beams constitute a matrix $W_1$, $$W_1 = \begin{bmatrix} b_0, \ldots, b_{I-1} & \\ & b_0, \ldots, b_{I-1} \end{bmatrix},$$

and I is a positive integer;

(2) obtaining, based on the selected matrix $W_1$, a matrix $W_{2,i}(f)$ of a downlink channel vector $G_{csi-rs,d}(f,i)$ ($G_{csi-rs,d}(f,i)$ representing an $i^{th}$ row of $G_{csi-rs,d}$ on an $f^{th}$ subband) of an $i^{th}$ port in the m non-transmit antenna ports on the $f^{th}$ subband, so that $G_{csi-rs,d}(f,i)^T = W_1 W_{2,i}(f)$ where for ease of representation, an identifier of the subband f is ignored below, and a form of the matrix $W_{2,i}$ is $W_{2,i} = [c_{i,0}, \ldots, c_{i,2I-1}]^T$, including $2I$ linear combination coefficients (i=1, m); and (3) obtaining, based on the selected matrix $W_1$, a matrix $W_{2,i}$ of a channel vector $G_{csi-rs,u}(i)$ in each row in $G_{csi-rs,u}$, and selecting a location (denoted as $l_1$) of an element from the x matrices $W_{2,i}$ on the entire bandwidth, where a wideband amplitude of the element of $G_{csi-rs,u}$ at the location is denoted as $a_{l_1}$).

The terminal device may report at least one of the following information:

(3.1) a wideband feeds back a $PMI_{1,0}$, where the $PMI_{1,0}$ indicates the location $l_1$ of the element on the entire bandwidth, optionally, $l_1$ may be predefined, and in this case, the terminal device does not need to report $PMI_{1,0}$;

(3.2) a wideband feedback $PMI_{1,1,i}$, indicating a location $l_{2,i}$ of an element with a largest wideband amplitude in $2I$ elements of an $i^{th}$ matrix $W_{2,i}$;

(3.3) a wideband feedback $PMI_{1,2,i}$, where $PMI_{1,2,i}$ indicates a ratio of the wideband amplitude $|W_{2,i}(l_{2,i})|_{WB}$ of the element at the location $l_{2,i}$ in $W_{2,i}$ to $a_{l_1}$, and the ratio is denoted as $x_{l2,i}$;

(3.4) a wideband feedback $PMI_{1,3,i}$, indicating a ratio of a wideband amplitude of each of elements of $W_{2,i}$ at remaining 2I−1 locations to $|W_{2,i}(l_{2,i})|_{WB}$, where the ratio is denoted as $y_u(j\in\{1, 2, \ldots M\}$; and In this step, an objective of power normalization by using $|W_{2,i}(l_{2,i})|_{WB}$ is to limit a value range of wideband amplitudes of the 2I−1 elements other than the element at the location $l_{2,i}$ to 0-1. A fixed quantization range facilitates quantization of these wideband amplitudes, and reduces a quantity of quantized bits.

(3.5) a subband feedback $PMI_{2,i}$, indicating a subband differential amplitude $z_{i,j}$ and a subband phase $u_{i,j}$ of 2I elements of $W_{2,i}$ on a subband f.

Both the amplitude information and the phase information may be quantized. Specifically, a quantization range of the wideband amplitude ratio $x_{l2,i}$ may be [−X, X] dB, where X is a positive integer, and a quantization interval may be Y dB, that is, a quantized ratio is an element in a set {−X, −X+Y, −X+2Y, X−Y, X}.

The network device can reconstruct a complete channel matrix based on reporting of the terminal device. Specifically, the network device may obtain, based on $PMI_{1,1}$ and $PMI_{1,0}$, a wideband amplitude value (which is assumed to be represented as $|b_{l_1}|$) of an element at a location $l_1$ in a matrix $W_2$ corresponding to $G_{srs}=\sqrt{p_{srs}}H_u$, and normalize the matrix $W_2$ corresponding to $G_{srs}$ by using $|b_{l_1}|$ as a reference, to eliminate impact of an SRS transmit power factor, and obtain $$H'_u = W_1 \frac{W_2}{|b_{l_1}|}.$$

Based on another PMI, the network device obtains a channel vector of an $i^{th}$ non-transmit port from which impact of a CSI-RS power factor is eliminated:

$H'_{d,i}=W_1W_{2,i}$, where $W_2[c_{i,0}, \ldots, c_{i,2I-1}]$, $c_{i,l_{2,i}}x_{l_{2,i}}z_{i,l_{2,i}}\exp(j2\pi u_{i,l_{2,i}})$ and $c_{i,j}=x_{l_{2,i}}y_{i,j}z_{i,j}\exp(j2\pi u_{i,j})$, and $(j\ne l_{2,i})$; and in this case, a complete channel matrix obtained by the network device is $$H' = \begin{bmatrix} H'_u \\ H'_d \end{bmatrix}.$$

In this case, the precoding matrix obtained by the network device based on the channel matrix is accurate, and is no longer affected by different transmit power factors of the SRS and the CSI-RS.

Embodiment 4

The network device measures SRSs sent by x transmit antenna ports, and obtains $$G_{srs} = \sqrt{p_{srs}}H_u = \sqrt{p_{srs}}\begin{bmatrix} H_{u,1} \\ \ldots \\ H_{u,x} \end{bmatrix} \in C^{x\times M}.$$

Eigenvalues of the matrix are decomposed into $G_{srs}^H G_{Srs}=U_u\Lambda_{srs}U_u^H$, and $\Lambda_{srs}$ includes eigenvalues $\lambda_{u,i}^{srs}$ (i=1, \ldots, x).

The network device sends CSI-RSs by using M antenna ports, and the terminal device estimates channels $$G_{csi-rs} = \begin{bmatrix} G_{csi-rs,u} \\ G_{csi-rs,d} \end{bmatrix} = \sqrt{p_{csi-rs}}\begin{bmatrix} H_u \\ H_d \end{bmatrix}$$

from the network device to x+m receive antenna ports of the terminal device by measuring the CSI-RSs. An eigenvalue of $G_{csi-rs,u}$ is decomposed into $(G_{csi-rs,u})^H G_{csi-rs,u}=U_{csis,u}\Lambda_{csirs,u}U_{csirs,u}^H$, and $\Lambda_{csirs,u}$ includes eigenvalues $\lambda_{u,j}^{csirs}$ (i=1, \ldots, x). An eigenvalue of $G_{csi-rs,d}$ is decomposed into $(G_{csi-rs,d})^H G_{csi-rs,d}=U_{csirs,d}\Lambda_{csirs,d}U_{csirs,d}^H$, and $\Lambda_{csirs,d}$ includes eigenvalues $\lambda_{d,i}^{csirs}$ (i=1, \ldots, x).

The terminal device feeds back R eigenvectors of $G_{csi-rs,d}$ of the m antenna ports and corresponding eigenvalue indication information, where $1\le R\le m$. Each piece of eigenvalue indication information indicates a ratio $$\frac{\lambda_{d,i}^{csirs}}{\lambda_{u,i_0}^{csirs}}$$

of an $r^{th}$ eigenvalue $\lambda_{d,i}^{csirs}$ of $G_{csi-rs,d}$ to an eigenvalue $\lambda_{u,i_0}^{csirs}$ (which may be selected by the terminal device, or may be predefined) of $G_{csi-rs,u}$. A dual codebook structure in the current technology may be used in a method for feeding back a feature vector, and details are not described herein. If $\lambda_{u,i_0}$ is selected by the terminal device, the terminal device further needs to feed back an index $i_0$ (similar to $l_1$ in the foregoing embodiment) of the eigenvalue. If $\lambda_{u,i_0}$ is predefined (for example, is a maximum eigenvalue of $G_{csi-rs,u}$), the terminal device does not need to feed back an index of the eigenvalue.

Specifically, a quantization range of the eigenvalue ratio $$\frac{\lambda_{d,r}}{\lambda_{u,i_0}}$$

may be [−X, X] dB, where X is a positive integer, and a quantization interval may be Y dB, that is, a quantized ratio is an element in a set {−X, −X+Y, −X+2Y, X−Y, X}.

The network device may normalize the eigenvalue $\lambda_{u,i}^{srs}$ of $G_{srs}$ based on the index $i_0$ that is of the eigenvalue and that is fed back by the terminal device, to obtain $$\frac{1}{\lambda_{u,i_0}^{srs}}G_{srs}^H G_{srs},$$

and eliminate impact of an SRS transmit power factor.

The network device may obtain normalized $$\frac{1}{\lambda_{u,i_0}^{csirs}}G_{csi-rs,d}^H G_{csi-rs,d}$$

based on the R eigenvectors of $G_{csi-rs,d}$ that are fed back by the terminal device and the corresponding eigenvalue indication information $$\left(\text{indicating } \frac{\lambda_{d,i}^{csirs}}{\lambda_{u,i_0}^{csirs}}\right).$$

This part of information is not affected by a CSI-RS transmit power factor. Ideally, $\lambda_{u,i_0}^{csirs}=\lambda_{u,i_0}^{srs}=\lambda_{u,i_0}$.

The network device may finally obtain a related matrix $$\frac{1}{\lambda_{u,i_0}^{csirs}}G_{csi-rs,d}^{H}G_{csi-rs,d}+\frac{1}{\lambda_{u,i_0}^{srs}}G_{srs}^{H}G_{srs}$$

of the complete channel matrix. The precoding matrix obtained based on the correlation matrix is not affected by different transmit power factors of the two reference signals.

According to the channel state information reporting method in this embodiment of this application, the terminal device feeds back eigenvalue information and eigenvector information of the channel of the non-transmit antenna port, so that the network device can restore the related matrix of the complete downlink channel matrix. In addition, the terminal device feeds back a related matrix of a channel of a transmit antenna port for use for a location (the foregoing index $i_0$) of an element with a normalized eigenvalue of the channel of the non-transmit antenna port, and feeds back a ratio $$\left(\frac{\lambda_{d,i}^{csirs}}{\lambda_{u,i_0}^{csirs}}\text{ described above}\right)$$

of an eigenvalue of the channel of the transmit antenna port to an eigenvalue of the channel of the non-transmit antenna port, so that a problem of an inaccurate precoding matrix caused by different transmit power of the SRS and the CSI-RS can be resolved.

Embodiment 5

The terminal device may feed back related information of a channel matrix $G_{csi-rs,d}$ by using an explicit feedback method. For example, the terminal device feeds back channel vectors of the m non-transmit antenna ports and relative power values (namely, the first indication information) between channels of the m non-transmit antenna ports and the channel of the x transmit antenna ports element by element. It is assumed that a CSI reporting bandwidth includes F subbands. A specific feedback manner is as follows.

(1) The terminal device may determine, based on CSI-RS measurement, a subband amplitude value $a_{l_1}(f)$ of an element at a location $l_1$ (f) in the x channel vectors corresponding to the first antenna port set on an $f^{th}$ subband. Optionally, $l_1$ (f) may be predefined, or may be selected by the terminal device. If $l_1$ (f) is selected by the terminal device, information that is about $l_1$ (f) and that is reported by the terminal device is $PMI_0$.

(2) For M elements included in a channel vector $H_{d,i}(f)$ corresponding to an $i^{th}$ antenna port in the m non-transmit antenna ports on the $f^{th}$ subband in the second antenna port set, the terminal device may report at least one of the following information:

a feedback $PMI_{1,i}$, indicating a location of an element with a largest subband amplitude in the M elements of $H_{d,i}$ on the $f^{th}$ subband, where the location is denoted as $l_{2,i}(f)$;

a feedback $PMI_{2,i}$, indicating a ratio of an amplitude $|H_{d,i}(l_{2,i}(f))|$ of the element of $H_{d,i}$ at the location $l_{2,i}(f)$ on the $f^{th}$ subband to $a_{l_1}$ (f), where the ratio is denoted as $x_{l2,i}(f)$ (that is, some content indicated by the first indication information);

a feedback $PMI_{3,i}$, indicating a ratio of a subband amplitude of each of elements of $H_{d,i}$ at remaining M−1 locations on the $f^{th}$ subband to $|H_{d,i}(l_{2,i})|$, where the ratio is denoted as $y_{i,j}(f)(j\in\{1, 2, \ldots M\}$; and a feedback $PMI_{4,i}$, indicating a subband phase $u_{i,j}$ of the M elements of $H_{d,i}$ on the $f^{th}$ subband.

All the foregoing amplitudes and phases may be quantized. Specifically, a quantization range of the amplitude ratio $x_{l2,i}(f)$ may be [−X, X] dB, where X is a positive integer, and a quantization interval may be Y dB, that is, a quantized ratio is an element in a set {−X, −X+Y, −X+2Y, . . . , X−Y, X}.

For ease of description, an identifier of the subband f is ignored below in this embodiment.

A channel matrix that is corresponding to an $i^{th}$ port on the $f^{th}$ subband and that may be restored by the network device based on the PMI reported by the terminal device is:

$H_{d,i}'=[h'_{i,0}\ldots h'_{i,M-1}]$, where $h'_{i,l_{2,i}}=x_{l_{2,i}}\exp(j2\pi u_{i,l_{2,i}})$ and $h'_{i,j}=x_{l_{2,i}}y_{i,j}\exp(j2\pi u_{i,j})(j\ne l_{2,i})$; in this case, $H_{d,i}'$ does not include impact of a CSI-RS transmit power factor; and therefore, the network device may obtain a channel matrix of the m antenna ports:

$$H_d'=\begin{bmatrix}H_{d,1}'\\ \cdots\\ H_{d,M}'\end{bmatrix}.$$

In addition, the network device may normalize, by using the wideband amplitude $|G_{srs}(l_1(f))|$ of the element at the location $l_1$ (f) as a reference, all elements of the channel matrix $G_{srs}=\sqrt{p_{srs}}H_u$ on the $f^{th}$ subband that are measured based on the SRS, to obtain $H'_u$. In this case, the matrix does not include impact of an SRS transmit power factor.

The network device reconstructs a complete channel matrix $$H'=\begin{bmatrix}H_u'\\ H_d'\end{bmatrix}.$$

The network device may further obtain the precoding matrix of downlink data based on the channel matrix.

In this embodiment, $l_1(f)$ and $l_{2,i}(f)$ each indicate information related to a subband amplitude. Therefore, the first indication information is a subband parameter.

In this embodiment of this application, the normalized element location $(l_1(f))$ is reported or predefined, and the differential value (that is, $x_{l2,i}(f)$) between the channel information of the transmit antenna port and the non-transmit antenna port is reported, so that a problem of an inaccurate precoding matrix caused by different transmit power of an SRS and a CSI-RS in a feedback solution in which there is no channel reciprocity in a TDD system can be resolved.

It should be understood that sequence numbers of the foregoing processes do not mean execution sequences. The execution sequences of the processes should be determined based on functions and internal logic of the processes, and should not be construed as any limitation on the implementation processes of the embodiments of this application.

The foregoing describes in detail the channel state information reporting method according to the embodiments of this application with reference to FIG. 1 to FIG. 3. The following describes in detail a channel state information reporting apparatus according to the embodiments of this application with reference to FIG. 4 to FIG. 7.

Figure 4:
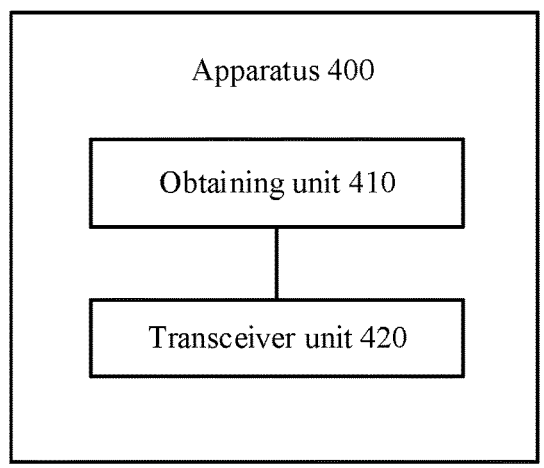
FIG. 4 is a schematic block diagram of a channel state information reporting apparatus according to an embodiment of this application.

FIG. 4 shows a channel state information reporting apparatus 400 according to an embodiment of this application. The apparatus 400 may be the terminal device in the foregoing embodiments, or may be a chip in the terminal device. The apparatus 400 includes:

an obtaining unit 410, configured to obtain first indication information, where the first indication information is used to indicate a differential value between channel state information of a first antenna port set and channel state information of a second antenna port set, the first antenna port set includes x antenna ports of the apparatus, the second antenna port set includes m antenna ports of the apparatus, the first antenna port set is different from the second antenna port set, and x and m are positive integers; and a transceiver unit 420, configured to send the first indication information.

According to the channel state information reporting apparatus in this embodiment of this application, the terminal device reports the differential value between the channel state information of the two parts of antenna ports, so that a network device can eliminate impact of different transmit power of the network device and the terminal device based on the differential value, thereby helping improve accuracy of the channel state information obtained by the network device, and improving data transmission performance.

Optionally, the first indication information is a wideband parameter, or the first indication information is a subband parameter.

Optionally, the channel state information of the first antenna port set includes first amplitude information associated with a channel matrix $G_u$ of the first antenna port set; and/or the channel state information of the second antenna port set includes second amplitude information associated with a channel matrix $G_d$ of the second antenna port set, where $G_d$ is a matrix with m rows and M columns, $G_u$ is a matrix with x rows and M columns, and M is a positive integer.

Optionally, the first amplitude information is determined based on any one of the following elements: an element whose amplitude information has a largest value in at least one row of elements of $G_u$, an element whose amplitude information has a largest value in at least one column of elements of a matrix $W_{2,u}$ corresponding to $G_u$, a singular value whose amplitude information has a largest value in at least one singular value of $G_u$, or an eigenvalue whose amplitude information has a largest value in at least one eigenvalue of $G_u$; and/or the second amplitude information is determined based on any one of the following elements: an element whose amplitude information has a largest value in at least one row of elements of $G_d$, an element whose amplitude information has a largest value in at least one column of elements of a matrix $W_{2,d}$ corresponding to $G_d$, an eigenvalue whose amplitude information has a largest value in at least one eigenvalue of $G_d$, or a singular value whose amplitude information has a largest value in at least one singular value of $G_d$, where $G_u^T(i_u) \times W_1 \times W_{2,u}(l_u)$, $G_d^T(l_d) = W_1 \times W_{2,d}(l_d)$, $X^T$ represents transposition of a matrix X, $X(l_u)$ represents an $l_u^{th}$ column of the matrix X, $X(l_d)$ represents an $l_d^{th}$ column of the matrix X, $W_1$ is an M*N matrix, $W_{2,u}$ is an N*x matrix, $W_{2,d}$ is an N*m matrix, N is a positive integer, $l_u \in \{1, 2, \ldots, x\}$, and $l_d \in \{1, 2, \ldots, m\}$.

Optionally, the first amplitude information is determined based on an element whose amplitude information has a largest value in at least one row of elements of $G_u$; and the second amplitude information includes n sub-elements, an $i^{th}$ sub-element in the n sub-elements is determined based on an element whose amplitude information has a largest value in M elements in an $i^{th}$ row in n rows of $G_d$, n is a positive integer, and $i \in \{1, 2, \ldots, n\}$.

Optionally, the first amplitude information is determined based on an element whose amplitude information has a largest value in at least one column of elements of a matrix $W_{2,u}$ corresponding to $G_u$; and the second amplitude information includes n sub-elements, an $i^{th}$ sub-element in the n sub-elements is determined based on an element whose amplitude information has a largest value in N elements in an $i^{th}$ column inn columns of a matrix $W_{2,d}$ corresponding to $G_d$, n is a positive integer, and $i \in \{1, 2, \ldots, n\}$, where $G_u^T(l_u) = W_1 \times W_{2,u}(l_u)$, $G_d^T(l_d) = W_1 \times W_{2,d}(l_d)$, $X^T$ represents transposition of a matrix X, $X(l_u)$ represents an $l_u^{th}$ column of the matrix X, $X(l_d)$ represents an $l_d^{th}$ column of the matrix X, $W_1$ is an M*N matrix, $W_{2,u}$ is an N*x matrix, $W_{2,d}$ is an N*m matrix, N is a positive integer, $l_u \in \{1, 2, \ldots, x\}$, and $l_d \in \{1, 2, \ldots, m\}$.

Optionally, the first amplitude information is determined based on an average value of amplitude information of at least two elements of $G_u$, and the second amplitude information is determined based on an average value of amplitude information of at least two elements of $G_d$; or the first amplitude information is determined based on an average value of amplitude information of at least two elements of a matrix $W_{2,u}$ corresponding to $G_u$, and the second amplitude information is determined based on an average value of amplitude information of at least two elements of a matrix $W_{2,d}$ corresponding to $G_d$, where $G_u^T = W_1 \times W_{2,u}(l_u)$ $G_d^T(l_d) = W_1 \times W_{2,d}(l_d)$, $X^T$ represent transposition of a matrix X, $X(l_u)$ represents an $l_u^{th}$ column of the matrix X, $X(l_d)$ represents an $l_d^{th}$ column of the matrix X, $W_1$ is an M*N matrix, $W_{2,u}$ is an N*x matrix, $W_{2,d}$ is an N*m matrix, N is a positive integer, $l_u \in \{1, 2, \ldots, x\}$, and $l_d \in \{1, 2, \ldots, m\}$.

Optionally, the first antenna port set is predefined, or is determined based on a configuration of the network device, or is determined based on a terminal capability reported by the terminal device; and/or the second antenna port set is predefined, or is determined based on a configuration of the network device, or is determined based on a terminal capability reported by the terminal device.

Optionally, the first antenna port set and/or the second antenna port set are/is determined by using configuration information carried in at least one of the following signaling: radio resource control RRC signaling, multiple access control MAC control element CE signaling, and downlink control information DCI signaling.

Optionally, the transceiver unit 420 is further configured to perform at least one of the following steps:

receiving a first reference signal, where the first reference signal is used to obtain the first indication information; sending the channel state information of the second antenna port set; and sending a second reference signal by using the first antenna port set.

Optionally, the first reference signal is a channel state information-reference signal CSI-RS; and/or the second reference signal is a sounding reference signal SRS.

It should be understood that the apparatus 400 herein is embodied in a form of a functional unit. The term "unit" herein may refer to an application-specific integrated circuit (ASIC), an electronic circuit, a processor (for example, a shared processor, a dedicated processor, or a group processor) and a memory that are configured to execute one or more software or firmware programs, a combined logic circuit, and/or another suitable component that supports a described function. In an optional example, a person skilled in the art may understand that the apparatus 400 may be specifically the terminal device in the foregoing embodiments, and the apparatus 400 may be configured to perform procedures and/or steps corresponding to the terminal device in the foregoing method embodiments. To avoid repetition, details are not described herein again.

Figure 5:
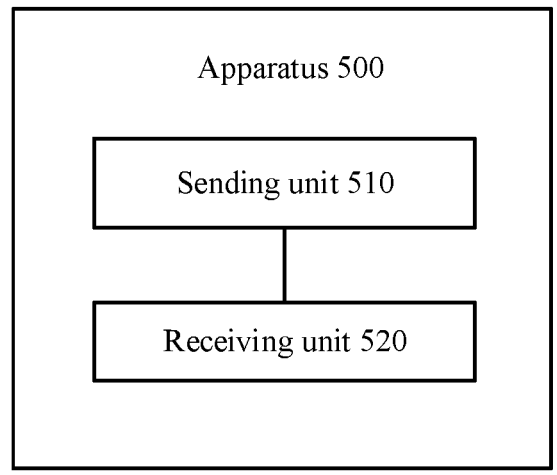
FIG. 5 is a schematic block diagram of another channel state information reporting apparatus according to an embodiment of this application.

FIG. 5 shows another channel state information reporting apparatus 500 according to an embodiment of this application. The apparatus 500 may be the network device in the foregoing embodiments, or may be a chip in the network device. The apparatus 500 includes:

a sending unit 510, configured to send a first reference signal;

a receiving unit 520, configured to receive first indication information that is obtained by a terminal device based on the first reference signal, where the first indication information is used to indicate a differential value between channel state information of a first antenna port set and channel state information of a second antenna port set, the first antenna port set includes x antenna ports of the terminal device, the second antenna port set includes m antenna ports of the terminal device, the first antenna port set is different from the second antenna port set, and x and m are positive integers.

According to the channel state information reporting apparatus in this embodiment of this application, the terminal device reports the differential value between the channel state information of the two parts of antenna ports, so that the network device can eliminate impact of different transmit power of the network device and the terminal device based on the differential value, thereby helping improve accuracy of the channel state information obtained by the network device, and improving data transmission performance.

Optionally, the first indication information is a wideband parameter, or the first indication information is a subband parameter.

Optionally, the channel state information of the first antenna port set includes first amplitude information associated with a channel matrix $G_u$ of the first antenna port set; and/or the channel state information of the second antenna port set includes second amplitude information associated with a channel matrix $G_d$ of the second antenna port set, where $G_d$ is a matrix with m rows and M columns, $G_u$ is a matrix with x rows and M columns, and M is a positive integer.

Optionally, the first amplitude information is determined based on any one of the following elements: an element whose amplitude information has a largest value in at least one row of elements of $G_u$, an element whose amplitude information has a largest value in at least one column of elements of a matrix $W_{2,u}$ corresponding to $G_u$, a singular value whose amplitude information has a largest value in at least one singular value of $G_u$, or an eigenvalue whose amplitude information has a largest value in at least one eigenvalue of $G_u$; and/or the second amplitude information is determined based on any one of the following elements: an element whose amplitude information has a largest value in at least one row of elements of $G_d$, an element whose amplitude information has a largest value in at least one column of elements of a matrix $W_{2,d}$ corresponding to $G_d$, an eigenvalue whose amplitude information has a largest value in at least one eigenvalue of $G_d$, or a singular value whose amplitude information has a largest value in at least one singular value of $G_d$, where $G_u^T(l_u)=W_1 \times W_{2,u}(l_u)$, $G_d^T(l_d)=W_1 \times W_{2,d}(l_d)$, $X^T$ represents transposition of a matrix X, $X(l_u)$ represents an $l_u$ th column of the matrix X, $X(l_d)$ represents an $l_d$ th column of the matrix X, $W_1$ is an M*N matrix, $W_{2,u}$ is an N*x matrix, $W_{2,d}$ is an N*m matrix, N is a positive integer, $l_u \in \{1, 2, \ldots, x\}$, and $l_d \in \{1, 2, \ldots, m\}$.

Optionally, the first amplitude information is determined based on an element whose amplitude information has a largest value in at least one row of elements of $G_u$; and the second amplitude information includes n sub-elements, an ith sub-element in the n sub-elements is determined based on an element whose amplitude information has a largest value in M elements in an ith row in n rows of $G_d$, n is a positive integer, and $i \in \{1, 2, \ldots, n\}$.

Optionally, the first amplitude information is determined based on an element whose amplitude information has a largest value in at least one column of elements of a matrix $W_{2,u}$ corresponding to $G_u$; and the second amplitude information includes n sub-elements, an ith sub-element in the n sub-elements is determined based on an element whose amplitude information has a largest value in N elements in an ith column in n columns of a matrix $W_{2,d}$ corresponding to $G_d$, n is a positive integer, and $i \in \{1, 2, \ldots, n\}$, where $G_u^T(l_u)=W_1 \times W_{2,u}(l_u)$, $G_d^T(l_d)$, $X^T$ represents transposition of a matrix X, $X(l_u)$ represents an $l_u$ th column of the matrix X, $X(l_d)$ represents an $l_d$ th column of the matrix X, $W_1$ is an M*N matrix, $W_{2,u}$ is an N*x matrix, $W_{2,d}$ is an N*m matrix, N is a positive integer, $l_u \in \{1, 2, \ldots, x\}$, and $l_d \in \{1, 2, \ldots, m\}$.

Optionally, the first amplitude information is determined based on an average value of amplitude information of at least two elements of $G_u$, and the second amplitude information is determined based on an average value of amplitude information of at least two elements of $G_d$; or the first amplitude information is determined based on an average value of amplitude information of at least two elements of a matrix $W_{2,u}$ corresponding to $G_u$, and the second amplitude information is determined based on an average value of amplitude information of at least two elements of a matrix $W_{2,d}$ corresponding to $G_d$, where $G_u^T(l_u)=W_1 \times W_{2,u}(l_u)$, $G_d^T(l_d)=W_1 \times W_{2,d}(l_d)$, $X^T$ represents transposition of a matrix X, $X(l_u)$ represents an $l_u$ th column of the matrix X, $X(l_d)$ represents an $l_d$ th column of the matrix X, $W_1$ is an M*N matrix, $W_{2,u}$ is an N*x matrix, $W_{2,d}$ is an N*m matrix, N is a positive integer, $l_u \in \{1, 2, \ldots, x\}$, and $l_d \in \{1, 2, \ldots, m\}$.

Optionally, the first antenna port set is predefined, or is determined based on a configuration of the network device, or is determined based on a terminal capability reported by the terminal device; and/or the second antenna port set is predefined, or is determined based on a configuration of the network device, or is determined based on a terminal capability reported by the terminal device.

Optionally, the first antenna port set and/or the second antenna port set are/is determined by using configuration information carried in at least one of the following signaling: RRC signaling, MAC CE signaling, and DCI signaling.

Optionally, the receiving unit 520 is further configured to perform at least one of the following steps: receiving the channel state information of the second antenna port set; and receiving a second reference signal sent by the terminal device by using the first antenna port set.

Optionally, the first reference signal is a CSI-RS, and/or the second reference signal is a SRS.

It should be understood that the apparatus 500 herein is embodied in a form of a functional unit. The term "unit" herein may refer to an application-specific integrated circuit (ASIC), an electronic circuit, a processor (for example, a shared processor, a dedicated processor, or a group processor) configured to execute one or more software or firmware programs, a memory, a merge logic circuit, and/or another suitable component that supports the described function. In an optional example, a person skilled in the art can understand that the apparatus 500 may specifically be the network device in the foregoing embodiments, and the apparatus 500 may be configured to perform procedures and/or steps that are in the foregoing method embodiments and that are corresponding to the network device. To avoid repetition, no further details are provided herein.

The apparatus 400 and the apparatus 500 in the foregoing solutions have functions for implementing corresponding steps performed by the terminal device and the network device in the foregoing methods. The function may be implemented by hardware or may be implemented by using hardware executing corresponding software. The hardware or the software includes one or more modules corresponding to the foregoing functions. For example, a sending unit may be replaced with a transmitter, a receiving unit may be replaced with a receiver, and another unit such as a determining unit may be replaced with a processor, to respectively perform a sending operation, a receiving operation, and a related processing operation in the method embodiments.

In the embodiments of this application, the apparatuses in FIG. 4 and FIG. 5 each may alternatively be a chip or a chip system, for example, a system on chip (SoC). Correspondingly, the receiving unit and the sending unit may be a transceiver circuit of the chip. This is not limited herein.

Figure 6:
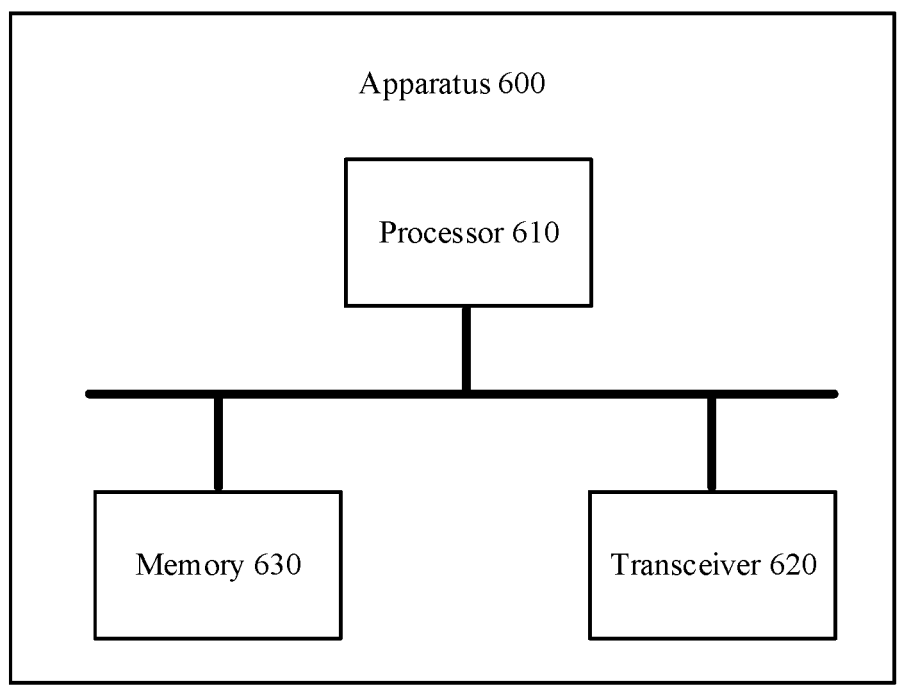
FIG. 6 is a schematic block diagram of another channel state information reporting apparatus according to an embodiment of this application.

FIG. 6 is another channel state information reporting apparatus 600 according to an embodiment of this application. The apparatus 600 includes a processor 610, a transceiver 620, and a memory 630. The processor 610, the transceiver 620, and the memory 630 communicate with each other by using an internal connection path, the memory 630 is configured to store an instruction, and the processor 610 is configured to execute the instruction stored in the memory 630, to control the transceiver 620 to send a signal and/or receive a signal.

The processor 610 is configured to obtain first indication information, where the first indication information is used to indicate a differential value between channel state information of a first antenna port set and channel state information of a second antenna port set, the first antenna port set includes x antenna ports of the apparatus, the second antenna port set includes m antenna ports of the apparatus, the first antenna port set is different from the second antenna port set, and x and m are positive integers; and the transceiver 620 is configured to send the first indication information.

It should be understood that the apparatus 600 may be specifically the terminal device in the foregoing embodiments, and may be configured to perform the steps and/or the procedures corresponding to the terminal device in the foregoing method embodiments. Optionally, the memory 630 may include a read-only memory and a random access memory, and provide an instruction and data for the processor. A part of the memory may further include a nonvolatile random access memory. For example, the memory may further store information about a device type. The processor 610 may be configured to execute the instruction stored in the memory; when executing the instruction stored in the memory, the processor 610 is configured to perform the steps and/or procedures in the foregoing method embodiment corresponding to the terminal device.

Figure 7:
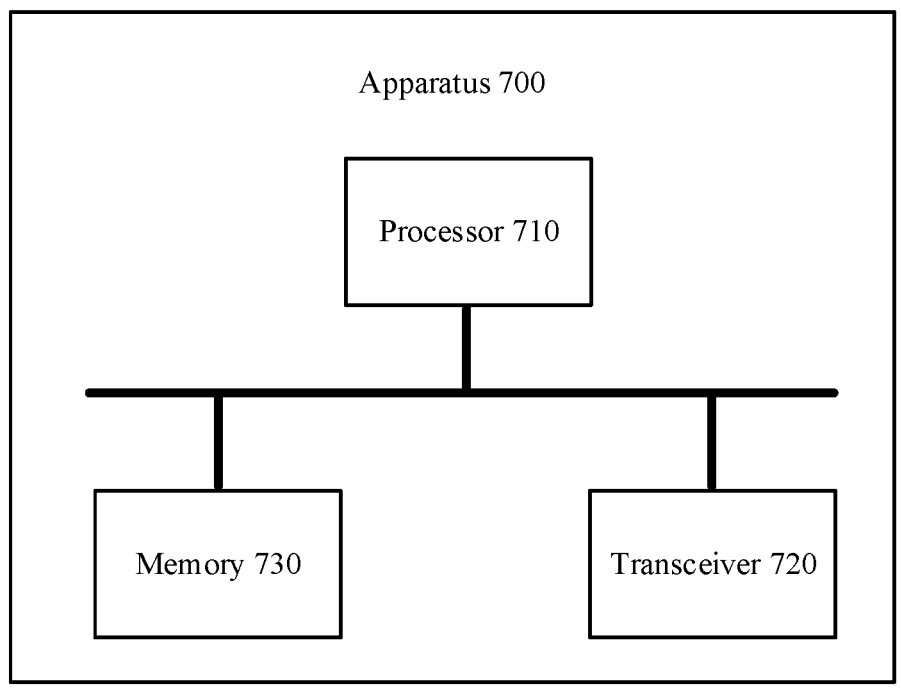
FIG. 7 is a schematic block diagram of another channel state information reporting apparatus according to an embodiment of this application.

FIG. 7 is another channel state information reporting apparatus 700 according to an embodiment of this application. The apparatus 700 includes a processor 710, a transceiver 720, and a memory 730. The processor 710, the transceiver 720, and the memory 730 communicate with each other by using an internal connection path, the memory 730 is configured to store an instruction, and the processor 710 is configured to execute the instruction stored in the memory 730, to control the transceiver 720 to send a signal and/or receive a signal.

The transceiver 720 is configured to send a first reference signal, and receive first indication information that is obtained by a terminal device based on the first reference signal, where the first indication information is used to indicate a differential value between channel state information of a first antenna port set and channel state information of a second antenna port set, the first antenna port set includes x antenna ports of the terminal device, the second antenna port set includes m antenna ports of the terminal device, the first antenna port set is different from the second antenna port set, and x and m are positive integers.

It should be understood that the apparatus 700 may be specifically the network device in the foregoing embodiments, and may be configured to perform the steps and/or the procedures corresponding to the network device in the foregoing method embodiments. Optionally, the memory 730 may include a read-only memory and a random access memory, and provide an instruction and data for the processor. A part of the memory may further include a nonvolatile random access memory. For example, the memory may further store information about a device type. The processor 710 may be configured to execute the instruction stored in the memory; when executing the instruction stored in the memory, the processor 610 is configured to perform the steps and/or procedures in the foregoing method embodiment corresponding to the network device.

It should be understood that in the embodiments of this application, the processor in the foregoing apparatus may be a central processing unit (CPU), or the processor may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

In an embodiment of an implementation process, steps in the foregoing methods can be implemented by using a hardware integrated logic circuit in the processor, or by using an instruction in a form of software. The steps of the method disclosed with reference to the embodiments of this application may be directly performed by a hardware processor, or may be performed by using a combination of hardware in the processor and a software unit. A software unit may be located in a mature storage medium in the art, such as a random access memory, a flash memory, a read-only memory, a programmable read-only memory, an electrically erasable programmable memory, or a register. The storage medium is located in the memory, and the processor executes the instruction in the memory and completes the steps in the foregoing method in combination with the hardware of the processor. To avoid repetition, details are not described herein again.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, method steps and units described in the embodiments disclosed in this specification may be implemented by electronic hardware, computer software, or a combination thereof. To clearly describe interchangeability between the hardware and the software, the foregoing has generally described steps and compositions of each embodiment according to functions. Whether the functions are performed by hardware or software depends on a particular application and a design constraint condition of the technical solutions. A person of ordinary skill in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments in this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the current technology, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A channel state information reporting method, comprising:
   obtaining, by a terminal device, first indication information, wherein the first indication information indicates a differential value between channel state information of a first antenna port set and channel state information of a second antenna port set, the first antenna port set comprises x antenna ports of the terminal device, the second antenna port set comprises m antenna ports of the terminal device, the first antenna port set is different from the second antenna port set, x and m are positive integers, and the channel state information of the first antenna port set comprises first amplitude information and/or the channel state information of the second antenna port set comprises second amplitude information; and
   sending, by the terminal device, the first indication information.

2. The method according to claim 1, wherein the first indication information is a wideband parameter, or the first indication information is a subband parameter.

3. The method according to claim 1, wherein the channel state information of the first antenna port set that comprises the first amplitude information is associated with a channel matrix ($G_u$) of the first antenna port set; and/or
   the channel state information of the second antenna port set that comprises the second amplitude information is associated with a channel matrix ($G_d$) of the second antenna port set, wherein
   $G_d$ is a matrix with m rows and M columns, $G_u$ is a matrix with x rows and M columns, and M is a positive integer.

4. The method according to claim 3, wherein the first amplitude information is determined based on any one of the following elements:
   an element whose amplitude information has a largest value in at least one row of elements of $G_u$, an element whose amplitude information has a largest value in at least one column of elements of a matrix ($W_{2,u}$) corresponding to $G_u$, a singular value whose amplitude information has a largest value in at least one singular value of $G_u$, or an eigenvalue whose amplitude information has a largest value in at least one eigenvalue of $G_u$; and/or
   the second amplitude information is determined based on any one of the following elements:
   an element whose amplitude information has a largest value in at least one row of elements of $G_d$, an element whose amplitude information has a largest value in at least one column of elements of a matrix ($W_{2,d}$) corresponding to $G_d$, an eigenvalue whose amplitude information has a largest value in at least one eigenvalue of $G_d$, or a singular value whose amplitude information has a largest value in at least one singular value of $G_d$, wherein $G_u^T(1_u)=W_1 \times W_{2,u}(1_u)$, $G_d^T(1_d)=W_1 \times W_{2,d}(1_d)$, $X^T$ represents transposition of a matrix (X), $X(1_u)$ represents an $1_u$th column of the matrix X, $X(1_d)$ represents an $1_d$th column of X, $W_1$ is an M*N matrix, $W_{2,u}$ is an N*x matrix, $W_{2,d}$ is an N*m matrix, N is a positive integer, $1_u \in \{1, 2, \ldots, x\}$, and $1_d \in \{1, 2, \ldots, m\}$.

5. The method according to claim 3, wherein the first amplitude information is determined based on an element whose amplitude information has a largest value in at least one row of elements of $G_u$; and the second amplitude information comprises n sub-elements, an ith sub-element in the n sub-elements is determined based on an element whose amplitude information has a largest value in M elements in an ith row in n rows of $G_d$, n is a positive integer, and $i \in \{1, 2, \ldots, n\}$.

6. The method according to claim 3, wherein the first amplitude information is determined based on an element whose amplitude information has a largest value in at least one column of elements of a matrix $(W_{2,u})$ corresponding to $G_u$; and the second amplitude information comprises n sub-elements, an ith sub-element in the n sub-elements is determined based on an element whose amplitude information has a largest value in N elements in an ith column in n columns of a matrix $(W_{2,d})$ corresponding to $G_d$, n is a positive integer, and $i \in \{1, 2, \ldots n\}$, wherein $G_u^T(1_u)=W_1 \times W_{2,u}(1_u)$, $G_d^T(1_d)=W_1 \times W_{2,d}(1_d)$, $X^T$ represents transposition of a matrix X, $X(1_u)$ represents an $1_u$ column of the matrix X, $X(1_d)$ represents an $1_d$ column of X, $W_1$ is an M*N matrix, $W_{2,u}$ is an N*x matrix, $W_{2,d}$ is an N*m matrix, N is a positive integer, $1_u \in \{1, 2, \ldots, x\}$, and $1_d \in \{1, 2, \ldots, m\}$.

7. The method according to claim 3, wherein the first amplitude information is determined based on an average value of amplitude information of at least two elements of $G_u$, and the second amplitude information is determined based on an average value of amplitude information of at least two elements of $G_d$; or the first amplitude information is determined based on an average value of amplitude information of at least two elements of a matrix $(W_{2,u})$ corresponding to $G_u$, and the second amplitude information is determined based on an average value of amplitude information of at least two elements of a matrix $(W_{2,d})$ corresponding to $G_d$, wherein $G_u^T(1_u)=W_1 \times W_{2,u}(1_u)$, $G_d^T(1_d)=W_1 \times W_{2,d}(1_d)$, $X^T$ represents transposition of a matrix X, $X(1_u)$ represents an $1_u$ column of the matrix X, $X(1_d)$ represents an $1_d$ column of X, $W_1$ is an M*N matrix, $W_{2,u}$ is an N*x matrix, $W_{2,d}$ is an N*m matrix, N is a positive integer, $1_u \in \{1, 2, \ldots, x\}$, and $1_d \in \{1, 2, \ldots, m\}$.

8. A channel state information reporting method, comprising:

sending, by a network device, a first reference signal; and receiving, by the network device, first indication information obtained by a terminal device based on the first reference signal, wherein the first indication information indicates a differential value between channel state information of a first antenna port set and channel state information of a second antenna port set, the first antenna port set comprises x antenna ports of the terminal device, the second antenna port set comprises m antenna ports of the terminal device, the first antenna port set is different from the second antenna port set, x and m are positive integers, and the channel state information of the first antenna port set comprises first amplitude information and/or the channel state information of the second antenna port set comprises second amplitude information.

9. The method according to claim 8, wherein the first indication information is a wideband parameter, or the first indication information is a subband parameter.

10. The method according to claim 8, wherein the channel state information of the first antenna port set the comprises the first amplitude information is associated with a channel matrix $(G_u)$ of the first antenna port set; and/or the channel state information of the second antenna port set that comprises the second amplitude information is associated with a channel matrix $(G_d)$ of the second antenna port set, wherein $G_d$ is a matrix with m rows and M columns, $G_u$ is a matrix with x rows and M columns, and M is a positive integer.

11. The method according to claim 10, wherein the first amplitude information is determined based on any one of the following elements:

an element whose amplitude information has a largest value in at least one row of elements of $G_u$, an element whose amplitude information has a largest value in at least one column of elements of a matrix $(W_{2,u})$ corresponding to $G_u$, a singular value whose amplitude information has a largest value in at least one singular value of $G_u$, or an eigenvalue whose amplitude information has a largest value in at least one eigenvalue of $G_u$; and/or the second amplitude information is determined based on any one of the following elements:

an element whose amplitude information has a largest value in at least one row of elements of $G_d$, an element whose amplitude information has a largest value in at least one column of elements of a matrix $(W_{2,d})$ corresponding to $G_d$, an eigenvalue whose amplitude information has a largest value in at least one eigenvalue of $G_d$, or a singular value whose amplitude information has a largest value in at least one singular value of $G_d$, wherein $G_u^T(1_u)=W_1 \times W_{2,u}(1_u)$, $G_d^T(1_d)=W_1 \times W_{2,d}(1_d)$, $X^T$ represents transposition of a matrix X, $X(1_u)$ represents an $1_u$ column of the matrix X, $X(1_d)$ represents an $1_d$ column of X, $W_1$ is an M*N matrix, $W_{2,u}$ is an N*x matrix, $W_{2,d}$ is an N*m matrix, N is a positive integer, $1_u \in \{1, 2, \ldots, x\}$, and $1_d \in \{1, 2, \ldots, m\}$.

12. The method according to claim 10, wherein the first amplitude information is determined based on an element whose amplitude information has a largest value in at least one row of elements of $G_u$; and the second amplitude information comprises n sub-elements, an ith sub-element in the n sub-elements is determined based on an element whose amplitude information has a largest value in M elements in an ith row in n rows of $G_d$, n is a positive integer, and $i \in \{1, 2, \ldots, n\}$.

13. The method according to claim 10, wherein the first amplitude information is determined based on an element whose amplitude information has a largest value in at least one column of elements of a matrix $(W_{2,u})$ corresponding to $G_u$; and the second amplitude information comprises n sub-elements, an ith sub-element in the n sub-elements is determined based on an element whose amplitude information has a largest value in N elements in an ith column in n columns of a matrix ($W_{2,d}$) corresponding to $G_d$, n is a positive integer, and i∈{1, 2, ... ,}, wherein $G_u^T(1_u)=W_1 \times W_{2,u}(1_u)$, $G_d^T(1_d)=W_1 \times W_{2,d}(1_d)$, $X^T$ represents transposition of a matrix X, $X(1_u)$ represents an $1_u$ column of the matrix X, $X(1_d)$ represents an $1_d$ column of X, $W_1$ is an M*N matrix, $W_{2,u}$ is an N*x matrix, $W_{2,d}$ is an N*m matrix, N is a positive integer, $1_u \in \{1, 2, \ldots, x\}$, and $1_d \in \{1, 2, \ldots, m\}$.

14. An apparatus, comprising:
at least one processor; and
at least one memory, coupled with the processor, wherein the at least one memory stores a computer program which, when executed by the at least one processor, causes the apparatus to:
 obtain first indication information, wherein the first indication information indicates a differential value between channel state information of a first antenna port set and channel state information of a second antenna port set, the first antenna port set comprises x antenna ports of a terminal device, the second antenna port set comprises m antenna ports of the apparatus, the first antenna port set is different from the second antenna port set, x and m are positive integers, and the channel state information of the first antenna port set comprises first amplitude information and/or the channel state information of the second antenna port set comprises second amplitude information, and send the first indication information.

15. The apparatus according to claim 14, wherein the first indication information is a wideband parameter, or the first indication information is a subband parameter.

16. The apparatus according to claim 14, wherein the channel state information of the first antenna port set that comprises the first amplitude information is associated with a channel matrix ($G_u$) of the first antenna port set; and/or
 the channel state information of the second antenna port set that comprises the second amplitude information is associated with a channel matrix ($G_d$) of the second antenna port set, wherein
 $G_d$ is a matrix with m rows and M columns, $G_u$ is a matrix with x rows and M columns, and M is a positive integer.

17. The apparatus according to claim 16, wherein the first amplitude information is determined based on any one of the following elements:
 an element whose amplitude information has a largest value in at least one row of elements of $G_u$, an element whose amplitude information has a largest value in at least one column of elements of a matrix ($W_{2,u}$) corresponding to $G_u$, a singular value whose amplitude information has a largest value in at least one singular value of $G_u$, or an eigenvalue whose amplitude information has a largest value in at least one eigenvalue of $G_u$; and/or
 the second amplitude information is determined based on any one of the following elements:
 an element whose amplitude information has a largest value in at least one row of elements of $G_d$, an element whose amplitude information has a largest value in at least one column of elements of a matrix ($W_{2,d}$) corresponding to $G_d$, an eigenvalue whose amplitude information has a largest value in at least one eigenvalue of $G_d$, or a singular value whose amplitude information has a largest value in at least one singular value of $G_d$, wherein $G_u^T(1_u)=W_1 \times W_{2,u}(1_u)$, $G_d^T(1_d)=W_1 \times W_{2,d}(1_d)$, $X^T$ represents transposition of a matrix X, $X(1_u)$ represents an $1_u$ column of the matrix X, $X(1_d)$ represents an $1_d$ column of X, $W_1$ is an M*N matrix, $W_{2,u}$ is an N*x matrix, $W_{2,d}$ is an N*m matrix, N is a positive integer, $1_u \in \{1, 2, \ldots, x\}$, and $1_d \in \{1, 2, \ldots, m\}$.

18. The apparatus according to claim 16, wherein the first amplitude information is determined based on an element whose amplitude information has a largest value in at least one row of elements of $G_u$; and
 the second amplitude information comprises n sub-elements, an ith sub-element in the n sub-elements is determined based on an element whose amplitude information has a largest value in M elements in an ith row in n rows of $G_d$, n is a positive integer, and i∈{1, 2, ..., n}.

19. The apparatus according to claim 16, wherein the first amplitude information is determined based on an element whose amplitude information has a largest value in at least one column of elements of a matrix ($W_{2,u}$) corresponding to $G_u$; and
 the second amplitude information comprises n sub-elements, an ith sub-element in the n sub-elements is determined based on an element whose amplitude information has a largest value in N elements in an ith column in n columns of a matrix ($W_{2,d}$) corresponding to $G_d$, n is a positive integer, and i∈{1, 2, ..., n}, wherein $G_u^T(1_u)=W_1 \times W_{2,u}(1_u)$, $G_d^T(1_d)=W_1 \times W_{2,d}(1_d)$, $X^T$ represents transposition of a matrix X, $X(1_u)$ represents an $1_u$ column of the matrix X, $X(1_d)$ represents an $1_d$ column of X, $W_1$ is an M*N matrix, $W_{2,u}$ is an N*x matrix, $W_{2,d}$ is an N*m matrix, N is a positive integer, $1_u \in \{1, 2, \ldots, x\}$, and $1_d \in \{1, 2, \ldots, m\}$.

20. The apparatus according to claim 14, wherein the apparatus is the terminal device.

* * * * *